United States Patent [19]

Itoh et al.

[11] Patent Number: 5,050,715
[45] Date of Patent: Sep. 24, 1991

[54] HYDRAULIC CONTROL APPARATUS FOR VEHICLE POWER TRANSMITTING SYSTEM HAVING FLUID COUPLING INCORPORATING LOCK-UP CLUTCH

[75] Inventors: Hiroshi Itoh; Kunio Morisawa, both of Toyota; Ryoji Habuchi, Aichi; Masami Sugaya; Yoshinobu Soga, both of Susono, all of Japan

[73] Assignee: Toyota Jidosha Kabushiki Kaisha, Toyota, Japan

[21] Appl. No.: 476,350

[22] Filed: Feb. 7, 1990

[30] Foreign Application Priority Data

Feb. 13, 1989 [JP] Japan .................................. 1-33142

[51] Int. Cl.[5] ...................... F16D 33/00; B60K 41/28
[52] U.S. Cl. ...................................... 192/3.3; 192/76; 74/867; 475/65
[58] Field of Search .................. 192/3.3, 3.29, 0.076, 192/0.052; 74/867, 868, 869, 890; 475/65

[56] References Cited

U.S. PATENT DOCUMENTS

| | | | |
|---|---|---|---|
| 4,095,486 | 6/1978 | Ohnuma | 74/890 |
| 4,152,947 | 5/1979 | van Deursen et al. | 74/230.17 F |
| 4,349,088 | 9/1982 | Ito et al. | 192/3.3 |
| 4,403,975 | 9/1983 | Rattunde | 474/18 |
| 4,665,770 | 5/1987 | Van Selous | 74/890 X |
| 4,772,249 | 9/1988 | Kouno et al. | 474/28 |
| 4,778,435 | 10/1988 | Sugaya et al. | 474/28 |
| 4,857,034 | 8/1989 | Kouno et al. | 474/28 |
| 4,867,732 | 9/1989 | Soga et al. | 74/866 X |

FOREIGN PATENT DOCUMENTS

| | | |
|---|---|---|
| 61-45167 | 3/1986 | Japan . |
| 63-20561 | 2/1988 | Japan . |
| 63-222942 | 9/1988 | Japan .................................. 74/867 |
| 1-188756 | 7/1989 | Japan . |

Primary Examiner—Allan D. Herrmann
Assistant Examiner—Andrea Pitts
Attorney, Agent, or Firm—Oblon, Spivak, McClelland, Maier & Neustadt

[57] ABSTRACT

A hydraulic control apparatus for a vehicle power transmitting system having a fluid coupling equipped with a lock-up clutch, and a transmission to which power is transmitted from an engine of the vehicle through the fluid coupling. The fluid coupling has an engaging chamber and a releasing chamber for engaging and releasing the lock-up clutch. The apparatus includes a discharge passage communicating with the engaging chamber, for normally draining the engaging chamber to a drain, to thereby normally release the lock-up clutch, and a rapid release valve connected to the discharge passage. The rapid release valve operates to by-pass the discharge passage to the drain therethrough, for thereby rapidly draining the engaging chamber to rapidly release the lock-up clutch. A lock-up pressure regulating valve is provided for regulating a lock-up clutch pressure applied to the fluid coupling, normally to a first value, and upon operation of the rapid release valve, to a second value higher than the first value.

11 Claims, 19 Drawing Sheets

FIG.23

| | HYDRAULIC CONTROL MODE | 3RD SOLENOID VALVE 330 | 4TH SOLENOID VALVE 346 | LOCK-UP CLUTCH 36 (EXCEPT WHERE SHIFT LEVER IS IN POSITION "R") | REVERSE INHIBIT (WHERE SHIFT LEVER IS IN POSITION "R") | 2ND LINE PRESSURE REDUCING CONTROL |
|---|---|---|---|---|---|---|
| A | LOCK-UP CLUTCH RELEASE | OFF | OFF | OFF | OFF | OFF |
| B | LOCK-UP CLUTCH RAPID RELEASE | OFF | ON | OFF | OFF | OFF |
| C | ACCUMULATOR BACK PRESSURE CONTROL | OFF | DUTY CYCLING | OFF | OFF | OFF |
| D | REVERSE INHIBIT | ON | OFF | ON | ON | OFF |
| E | 2ND LINE PRESSURE REDUCTION | ON | ON | ON | ON | ON |

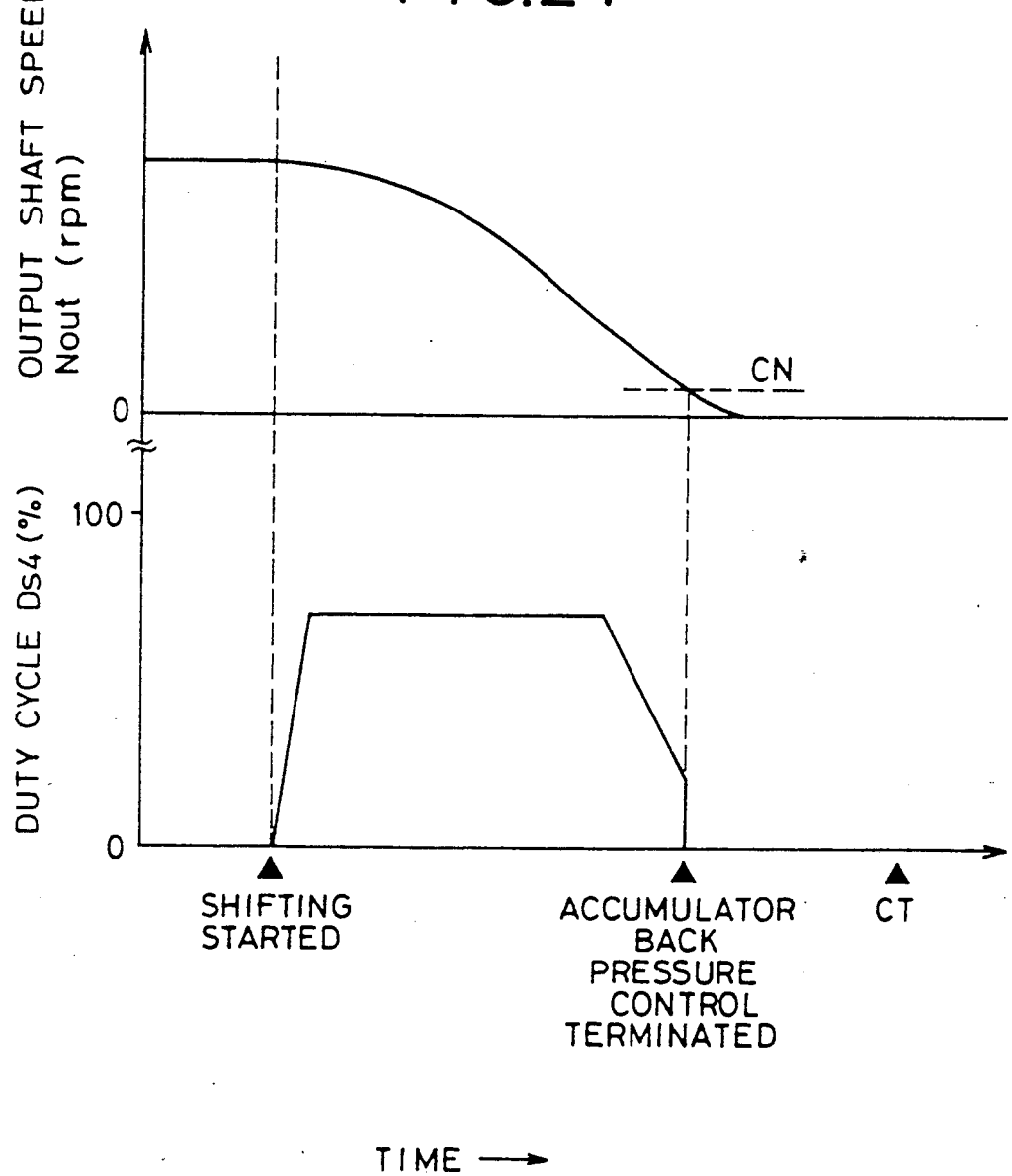

HYDRAULIC CONTROL APPARATUS FOR VEHICLE POWER TRANSMITTING SYSTEM HAVING FLUID COUPLING INCORPORATING LOCK-UP CLUTCH

BACKGROUND OF THE INVENTION

1. Field of the Invention

The present invention relates to a hydraulic control apparatus for a hydraulically operated power transmitting system for automotive vehicles having a fluid coupling which incorporates a lock-up clutch.

2. Discussion of the Prior Art

In the art of an automotive vehicle, there is known a hydraulically operated power transmitting system in which power is transmitted from an engine to a transmission via a fluid coupling which is equipped with a lock-up clutch. In this type of vehicle power transmitting system, a hydraulic control apparatus includes a lock-up clutch control valve which is adapted to switch the lock-up clutch between its engaged position and its released or disengaged position, by feeding a working fluid into one of the engaging and releasing chambers formed within the fluid coupling. An example of this type of hydraulic control apparatus is disclosed in laid-open Publication No. 61-45167 of unexamined Japanese Patent Application.

The lock-up clutch is generally provided to eliminate a power loss caused by the power transmission by the fluid coupling. In this respect, it is desirable that the lock-up clutch be engaged a comparatively short time after the vehicle is started or after the transmission is shifted from one position to another. To this end, the lock-up clutch is controlled such that the clutch is engaged when the vehicle running speed exceeds a predetermined reference value, and released when the vehicle speed is lowered below the reference value. This reference value is determined to be as low as possible to the extent that assures normal running of the vehicle. This arrangement, however, may cause an undesirable situation in which the drive wheels of the vehicle are brought to a stop before the lock-up clutch is fully released, whereby the engine may stall upon stopping of the vehicle. This situation occurs when an abrupt brake is applied to the vehicle or the vehicle is braked during running on a road surface having a low friction coefficient.

SUMMARY OF THE INVENTION

It is therefore an object of the present invention to provide a hydraulic control apparatus for a vehicle power transmitting system including a lock-up clutch, which apparatus permits the lock-up clutch to be released in a short response time.

The above object may be achieved according to the principle of the present invention, which provides a hydraulic control apparatus for a power transmitting system for an automotive vehicle having a fluid coupling equipped with a lock-up clutch, and a transmission to which power is transmitted from an engine of the vehicle through the fluid coupling, the fluid coupling having an engaging chamber and a releasing chamber for operating the lock-up clutch such that the lock-up clutch is engaged and released with a working fluid supplied to one of the engaging and releasing chambers and discharged from the other of the chambers, wherein the improvement comprises: (a) a discharge passage communicating with the engaging chamber of the fluid coupling, for normally draining the engaging chamber to a drain; (b) a lock-up clutch rapid release valve connected to the discharge passage, and operable to by-pass the discharge passage to the drain therethrough, for thereby rapidly draining the engaging chamber to rapidly release the lock-up clutch; and (c) a lock-up pressure regulating valve for regulating a lock-up clutch pressure applied to the fluid coupling, normally to a first value, and upon operation of the lock-up clutch rapid release valve, to a second value higher than the first value.

In the hydraulic control apparatus of the present invention constructed as described above, the engaging chamber of the fluid coupling may be rapidly drained through the lock-up clutch rapid release valve, to rapidly release the lock-up clutch when the lock-up clutch rapid release valve is operated. Further, the operation of the rapid release valve causes the lock-up pressure regulating valve to increase the lock-up clutch pressure to a value higher than the normal value. This also contributes to reduction in time required for fully releasing the lock-up clutch. The reduced releasing time, i.e., short releasing response of the lock-up clutch makes it possible to prevent conventionally experienced stalling of the engine when abrupt brake is applied to the vehicle or when brake application is effected on a road surface having a comparatively low friction coefficient, even if the lock-up clutch is commanded to be released when the vehicle running speed, for example, falls below a relatively low reference value.

The apparatus may further comprise a lock-up clutch control valve for applying the lock-up clutch pressure selectively to one of the engaging and releasing chambers of the fluid coupling while permitting the other chamber to be drained. When the lock-up clutch rapid release valve is not operated, the engaging chamber is normally drained through the discharge passage and the lock-up clutch control valve. When the lock-up clutch rapid release valve is operated, the engaging chamber is rapidly drained through a part of the discharge passage and the lock-up clutch rapid release valve.

The lock-up pressure regulating valve may include a spool for regulating the lock-up clutch pressure, and a chamber for receiving a pilot pressure to bias the spool in a direction for increasing the lock-up clutch pressure. In this case, the lock-up clutch rapid release valve has a port for applying the pilot pressure to the chamber of the lock-up clutch pressure regulating valve, upon operation of the lock-up clutch rapid release valve, to regulate the lock-up clutch pressure to the second value.

Alternatively, the lock-up pressure regulating valve may include a spool for regulating the lock-up clutch pressure, and a chamber for receiving a pilot pressure to bias the spool in a direction for reducing the lock-up clutch pressure. In this case, the lock-up clutch rapid release valve has a port for normally applying the pilot pressure to the chamber of the lock-up clutch pressure regulating valve. This port is connected to a drain to drain the chamber of the lock-up pressure regulating valve, upon operation of the lock-up clutch rapid release valve, to regulate the lock-up clutch pressure to the second value. In this instance, the lock-up pressure regulating valve may have another chamber for biasing the spool in a direction for increasing the lock-up clutch pressure. This another chamber is adapted to receive another pilot pressure which is indicative of a currently required output of the engine.

The apparatus may use solenoid-operated valve means for operating the lock-up clutch rapid release valve, and control means for controlling the solenoid-operated valve means to be operated to a rapid release position. In this position, the discharge passage is connected to the drain by the lock-up clutch rapid release valve, and at the same time a pilot pressure is applied from the lock-up clutch rapid release valve to the lock-up clutch pressure regulating valve for increasing the lock-up pressure to the second value. The control means may be adapted to control the solenoid-operated valve means, depending upon a running speed of the vehicle. In this case, the control means may be adapted to command the solenoid-operated valve means so as to connect the discharge passage to the drain through the lock-up clutch rapid release valve and apply the pilot pressure to the lock-up clutch pressure regulating valve, when the running speed of the vehicle falls below a predetermined lower limit. Alternatively, the control means may be adapted to control the solenoid-operated valve means, depending upon whether brake is applied to the vehicle or not.

The engaging chamber of the fluid coupling may be normally drained through an oil cooler for cooling a working fluid used for operating the fluid coupling and the transmission.

The transmission may include a continuously variable transmission having a pair of shafts one of which is connected to the fluid coupling, a pair of variable-diameter pulleys provided on the pair of shafts, respectively, and a belt connecting the pulleys.

BRIEF DESCRIPTION OF THE DRAWINGS

The above and other objects, features and advantages of the present invention will become more apparent by reading the following detailed description of presently preferred embodiments of the present invention, when considered in conjunction with the accompanying drawings, in which:

FIG. 23 is a view showing on-off states of the third and fourth solenoid valves in different hydraulic control modes A, B, C, D and E;

FIG. 24 is a time chart showing changes in the CVT output shaft speed and the duty cycle of the fourth solenoid valve, when the CVT is shifted to DRIVE position D;

DETAILED DESCRIPTION OF THE PREFERRED EMBODIMENTS

Figure 1:
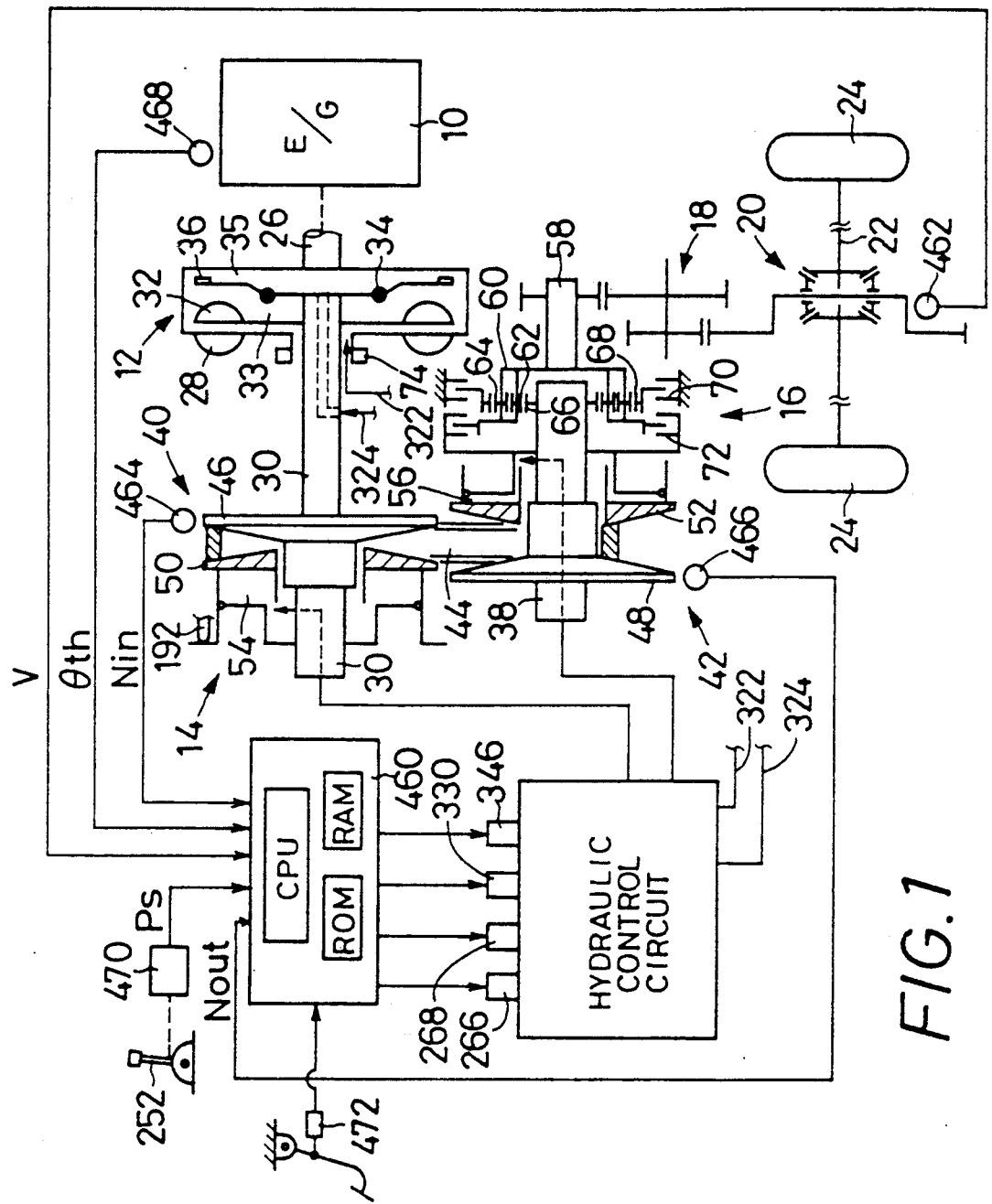
FIG. 1 is a schematic view of a vehicle power transmitting system equipped with a hydraulic control apparatus constructed according to one embodiment of the present invention.

Referring first to FIG. 1, there is illustrated a power transmitting system of an automotive vehicle, for transmitting power from an engine 10 to drive wheels 24, 24. The power transmitting system includes: a fluid coupling 12 connected to the engine 10 through a crankshaft 26 and equipped with a lock-up clutch 36; a continuously variable transmission (hereinafter referred to as "CVT") 14 connected to the fluid coupling 12; a reversing device 16 connected to the CVT 14, for selecting a forward or a reverse running of the vehicle, an intermediate gear device 18 connected to the reversing device 16; a differential gear device 20 connected to the intermediate gear device 18; and a drive axle 22 connected to the differential gear device 20 and drive wheels 24.

The fluid coupling 12 includes a pump impeller 28 connected to the crankshaft 26 of the engine 10; a turbine impeller 32 which is fixed to an input shaft 30 of the CVT 14 and rotated by means of a working fluid from the pump impeller 28; the lock-up clutch 36 indicated above, which is fixed to the input shaft 30 through a damper 34; and means for defining an engaging chamber 33 communicating with an engaging line 322 (which will be described), and a releasing chamber 35 communicating with a releasing line 324 (which will be described). The fluid coupling 12, which is filled with the working fluid, is operated to effect engagement of the lock-up clutch 36 for direct connection of the crankshaft 26 to the input shaft 30, when the speed of the vehicle, engine 10 or pump impeller 28, for example, exceeds a predetermined value. In this case, the fluid is fed into the engaging chamber 33 while the fluid in the releasing chamber 35 is discharged. When the vehicle speed or other speed indicated above falls below the predetermined value, on the other hand, the lock-up clutch 36 is disengaged or released such that the fluid is fed into the releasing chamber 35 and discharged from the engaging chamber 33.

The CVT 14 has a pair of variable-diameter pulleys 40, 42 having a same diameter which are provided on the input shaft 30 and an output shaft 38, respectively. These pulleys 40, 42 are connected by a transmission belt 44, and have respective stationary rotors 46, 48 fixed to the respective input and output shafts 30, 38, and respective axially movable rotors 50, 52 which are axially movable on the respective shafts 30, 38 and rotated with these shafts. The movable rotors 50, 52 are moved by respective first and second hydraulic actuators in the form of first and second hydraulic cylinders 54, 56, whereby the effective widths of V grooves of the pulleys 40, 42, i.e., the effective diameters engaging the belt 44 are changed, to change a speed ratio "e" of the CVT 14 (speed Nout/Nin, where Nout=speed of the output shaft 38, and Nin=speed of the input shaft 30).

Since the variable-diameter pulleys 40, 42 have the same diameter, the corresponding first and second hydraulic cylinders 54, 56 have a same pressure-receiving area. Generally, the tension of the transmission belt 44 is determined primarily by the pressure in one (hereinafter referred to as "driven side cylinder") of the first and second hydraulic cylinders 54, 56 which corresponds to the driven one of the pulleys 40, 42 (hereinafter referred to as "driven side pulley"). The driven side cylinder 54 or 56 is supplied with a second line pressure Pl2 which is adjusted by a second pressure regulating valve 102 (which will be described), whereby the tension of the belt 44 is adjusted to within an optimum range in which the belt 44 does not slip on the pulleys 40, 42.

The reversing device 16 is a well known double-pinion type planetary gear mechanism, which includes: a carrier 60 fixed on an output shaft 58; a pair of planetary gears 62, 64 which are rotatably supported by the carrier 60 and which mesh with each other; a sun gear 66 which is fixed on the input shaft 38 (output shaft of the CVT 14) and which meshes with the inner planetary gear 62; a ring gear 68 meshing with the outer planetary gear 64; a REVERSE brake 70 for stopping the rotation of the ring gear 68; and a FORWARD clutch 72 for connecting the carrier 60 and the input shaft 38.

The REVERSE brake 70 and FORWARD clutch 72 are hydraulically operated, frictionally coupling devices. The reversing device 16 is placed in a neutral position thereof when the brake 70 and the clutch 72 are both in the disengaged or released positions. In this state, the reversing device 16 does not transmit power to the intermediate gear device 18. When the FORWARD clutch 72 is engaged, the output shaft 38 (input shaft of the device 16) of the CVT 14 and the output shaft 58 of the device 16 are connected to each other, whereby power is transmitted from the CVT 14 to the intermediate gear device 18, so as to run the vehicle in the forward direction. When the REVERSE brake 70 is engaged, on the other hand, the direction of rotation of the output shaft 58 of the reversing device 16 is reversed with respect to the direction of rotation of the output shaft 38 of the CVT 14, whereby power is transmitted so as to run the vehicle in the reverse direction.

Figure 2:
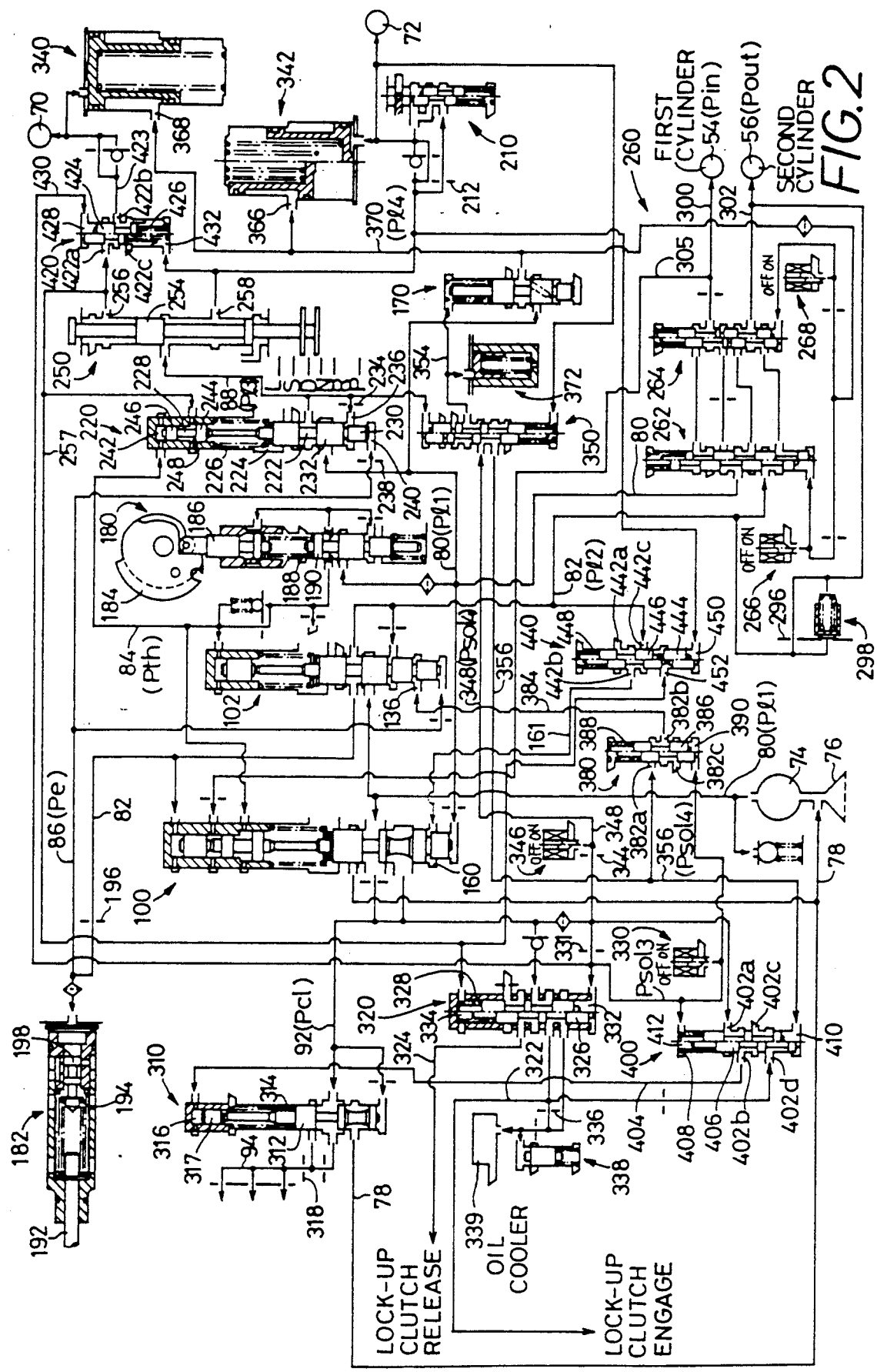
FIG. 2 is a hydraulic circuit diagram showing the hydraulic control apparatus adapted to control the power transmitting system of FIG. 1.

Referring next to FIG. 2 showing a hydraulic control circuit for controlling the vehicle power transmitting system of FIG. 1, reference numeral 74 designates an oil pump serving as a hydraulic power source of the hydraulic system, which constitutes a part of a hydraulic control apparatus constructed according to the instant embodiment of the present invention, which will be described. The oil pump 74 is connected to the pump impeller 28 of the fluid coupling 12, whereby the pump 74 is always rotated with the crankshaft 26 of the engine 10. In operation, the pump 74 pumps up a working fluid through a strainer 76 from a reservoir to which the fluid is returned. The pump 74 also communicates with a suction line 78, so that the fluid returned through the suction line 78 is sucked into the pump 74. The pressurized fluid produced by the pump 74 is delivered as a first line pressure Pl1 into a first pressure line 80. In the present embodiment, the first line pressure Pl1 is regulated by an overflow or relief type first pressure regulating valve 100, which discharges the fluid in the first pressure line 80 into the suction line 78 and a lock-up clutch line 92. The first line pressure Pl1 is lowered by the above-indicated second pressure regulating valve 102, to produce the above-indicated second line pressure Pl2 in a second pressure line 82. The second pressure regulating valve 102 is of a pressure reducing type, contrary to the overflow type of the first pressure regulating valve 100.

Figure 3:
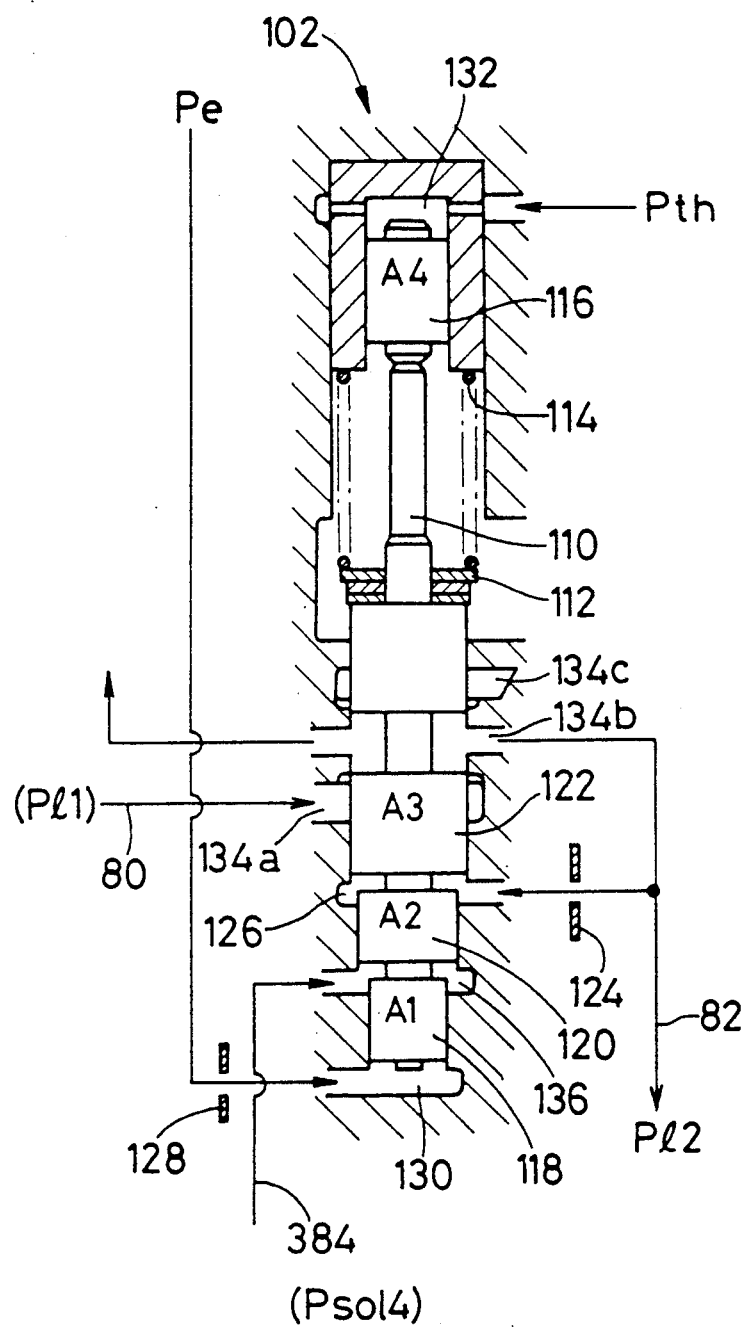
FIG. 3 is a view illustrating in detail a second pressure regulating valve incorporated in the apparatus of FIG. 2.

The second pressure regulating valve 102 will be first described in detail, by reference to FIG. 3.

This pressure regulating valve 102 includes a valve spool 110 for effecting connection and disconnection of the first pressure line 80 to and from the second pressure line 82, a spring sheet 112, a return spring 114, and a plunger 116. The valve spool 110 is provided at one axial end portion thereof remote from the plunger 116, with a first, a second and a third land 118, 120 and 122, which have different diameters. The first land 118 at the extreme end of the spool 110 has the smallest diameter, while the axially innermost third land 122 has the larger diameter. Between the second and third lands 120, 122, there is formed a chamber 126 to which is applied as a feedback pressure the second line pressure Pl2 through a flow restrictor 124, so that the valve spool 110 is biased toward its closed position by the second line pressure Pl2. Another chamber 130 is formed adjacent to the first land 118 at the above-indicated one end of the valve spool 110. To this chamber 130, there is applied a SPEED-RATIO pressure Pe (which will be described) through a flow restrictor 128. This pressure Pe also biases the valve spool 110 toward the closed position.

The return spring 114 disposed around the valve spool 110 biases the spool 110 toward its open position, through the spring sheet 112. The second pressure regulating valve 102 has another chamber 132 adjacent to the plunger 116. This chamber 132 is adapted to receive a THROTTLE pressure Pth which will be described. The valve spool 110 is positioned under equilibrium of forces according to the following equation (1):

$$Pl2 = (A4 \cdot Pth + W - A1 \cdot Pe)/(A3 - A2) \quad (1)$$

where,
- A1: pressure-receiving area of the first land 118
- A2: cross sectional area of the second land 120
- A3: cross sectional area of the third land 122
- A4: pressure-receiving area of the plunger 116
- W: biasing force of the return spring 114

Figure 7:
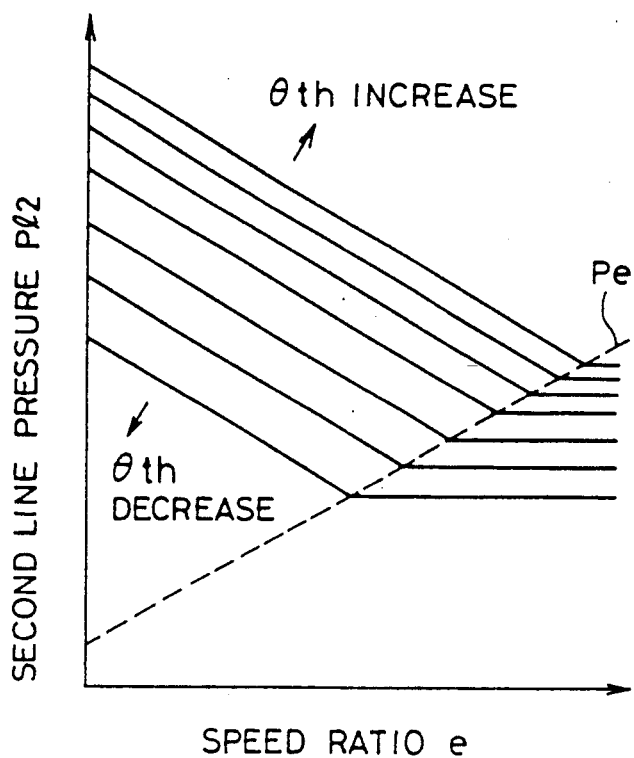
FIG. 7 is a graph showing an output characteristic of the second pressure regulating valve of FIG. 3.

Namely, the valve spool 110 is axially moved according to the equation (1), so as to repeatedly alternately establish communication between a port 134a and a port 134b for permitting a flow of the fluid from the first pressure line 80 into the second pressure line 82, and communication between the port 134b and a drain port 134c for draining the second pressure line 82 through the drain port 134c. As a result, the second line pressure Pl2 is produced. Since the second pressure line 82 is a closed hydraulic circuit, the second line pressure Pl2 can be adjusted by the second pressure regulating valve 102, by lowering the relatively high first line pressure Pl1, as indicated in FIG. 7.

Between the first and second lands 118, 120 of the valve spool 110 of the second pressure regulating valve 102, there is formed a chamber 136 adapted to receive a PRESSURE REDUCING pilot pressure Psol4 through a second line pressure reducing control valve 380 which will be described. As the valve spool 110 is biased toward its closed position by the pilot pressure Psol4, the second line pressure Pl2 is accordingly reduced. This reduction in the second line pressure will be described later in more detail. The chamber 136 will be referred to as a pressure-reducing chamber, when appropriate, for the reason which will become apparent.

Figure 4:
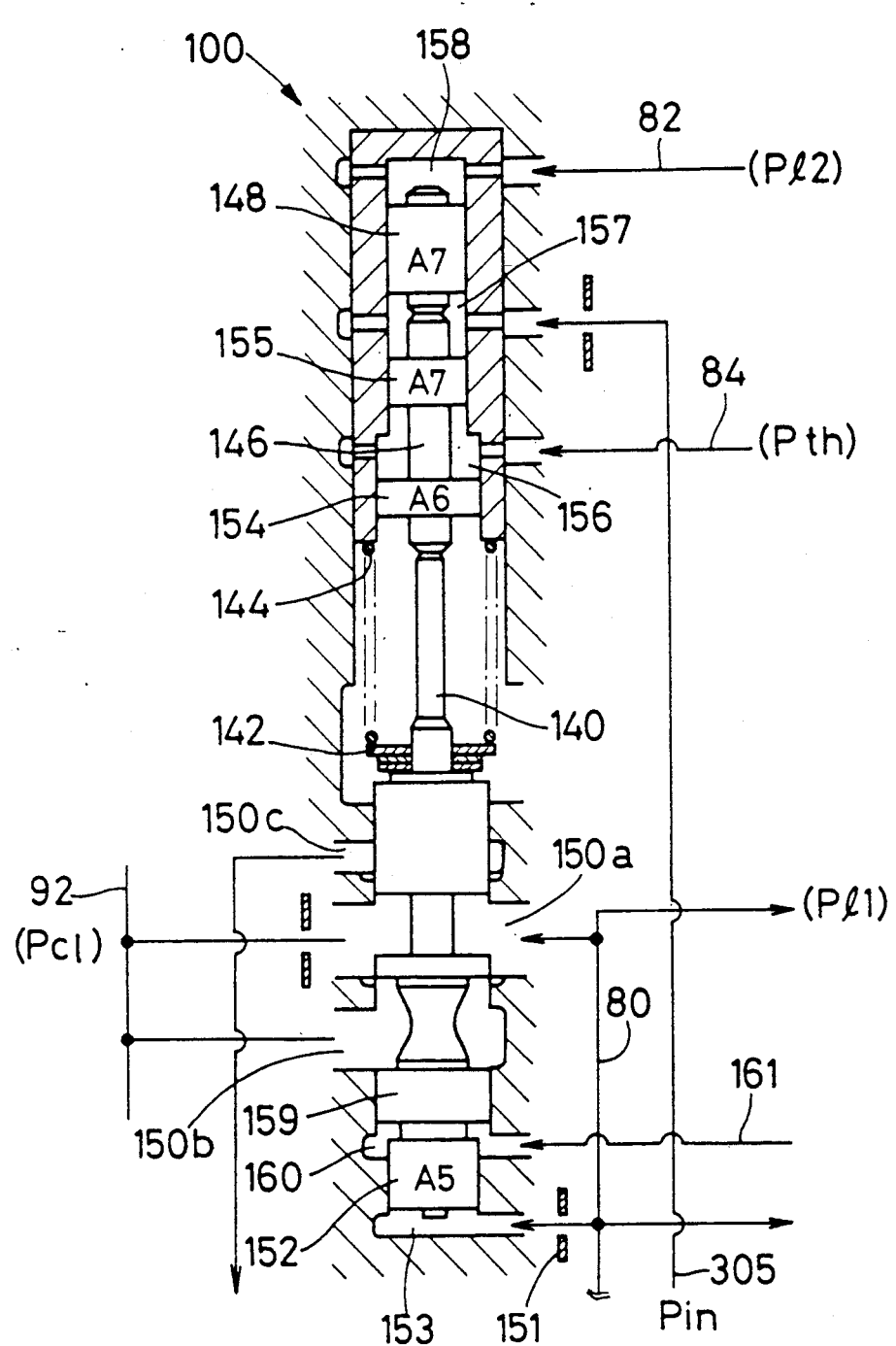
FIG. 4 is a view illustrating in detail a first pressure regulating valve also incorporated in the apparatus of FIG. 2.

Referring next to FIG. 4, the first pressure regulating valve 100 will then be described. This valve 100 includes a valve spool 140, a spring sheet 142, a return spring 144, a first plunger 146, and a second plunger 148 whose diameter is the same as a second land 155 of the first plunger 146. The valve spool 100 is operated to effect selective connection and disconnection of a port 150a communicating with the first pressure line 80, to and from a drain port 150b or 150c. The valve spool 140 has a first land 152 at one axial end thereof remote from the first and second plungers 146, 148. Adjacent to the first land 152 of the spool 140, there is formed a chamber 153 which receives as a feedback pressure the first line pressure Pl1 through a flow restrictor 151. The valve spool 140 is biased toward its closed position by this first line pressure Pl1. The first plunger 146, which is coaxial with the valve spool 140, has a first land 154 which cooperates with the above-indicated second land 155 to define a chamber 156 adapted to receive the THROTTLE pressure Pth. Between the second land 155 of the first plunger 146 and the second plunger 148, there is formed a chamber 157 adapted to receive a pressure Pin in the first hydraulic cylinder 54, through a branch line 305. Further, a chamber 158 is formed adjacent to the end face of the second plunger 148. The chamber 158 receives the second line pressure Pl2. The biasing force of the above-indicated return spring 144 acts on the valve spool 140 through the valve sheet 142 so as to bias the spool 140 toward its open position. The valve spool 140 is positioned under equilibrium of forces according to the following equation (2):

$$Pl1 = [(Pin\ or\ Pl2) \cdot A7 + Pth(A6 - A7) + W]/A5 \quad (2)$$

where,
- A5: pressure-receiving area of the first land 152 of the valve spool 140
- A6: cross sectional area of the first land 154 of the first plunger 146
- A7: cross sectional area of the second land 155 of the first plunger 146 (second plunger 148)
- W: biasing force of the return spring 144

In the first pressure regulating valve 100, the first and second plungers 146, 148 are separated from each other and a thrust due to the pressure Pin in the first cylinder 54 acts on the valve spool 140 in the direction toward the closed position, when the pressure Pin is higher than the second line pressure Pl2 (which is normally equal to the pressure Pout in the second cylinder 56. When the pressure Pin is lower than the second line pressure Pl2, the first and second plungers 146, 148 are held in abutting contact with each other, whereby a thrust due to the second line pressure Pl2 acting on the end face of the second plunger 148 acts on the valve spool 140 in the direction toward its closed position. That is, the second plunger 148 receiving the pressure Pin and the second line pressure Pl2 applies to the spool 140 a force based on the higher one of the pressures Pin and Pl2, so that the spool 140 is biased toward its closed position.

Between the first and second lands 152 and 159 of the valve spool 140, there is formed a chamber 160 adapted to receive the second line pressure Pl2 which is applied through a line 161 from a first line pressure reducing control valve 440 (which will be described). The pressure Pl2 in this chamber 160 acts on the valve spool 140 in a direction that causes the first line pressure Pl1 to be lowered. When the control valve 440 is operated to apply the second line pressure Pl2 to the chamber 160 while a shift lever 252 (FIG. 1) of the vehicle is placed in an operating position "N" (NEUTRAL) or "P" (PARKING), the first line pressure Pl1 is lowered. This reduction in the first line pressure will be described later in more detail.

Figure 5:
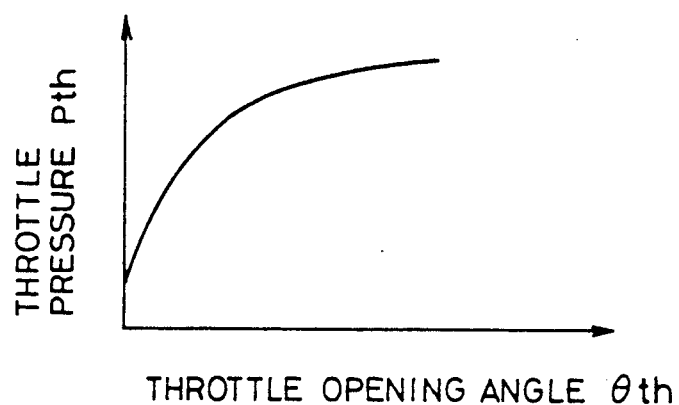
FIG. 5 is a graph indicating an output characteristic of a flow restrictor sensing valve incorporated in the apparatus of FIG. 2.

Referring back to FIG. 2, the THROTTLE pressure Pth representing an actual opening angle θth of a throttle valve of the engine 10 is generated by a flow restrictor sensing valve 180. Further, the SPEED-RATIO pressure Pe representing an actual speed ratio "e" of the CVT 14 is generated by a speed-ratio sensing valve 182. Described specifically, the throttle sensing valve 180 includes: a cam 184 rotated as the throttle valve is operated; a plunger 186 which engages a cam surface of the cam 184 and which is axially moved by a distance corresponding to an angle of rotation of the cam 184; a spring 188; and a valve spool 190 which receives a thrust through the spring 188 from the plunger 186, and a thrust due to the first line pressure Pl1. These two thrust forces act on the spool 190 in the opposite directions. The valve spool 190 is moved to a position of equilibrium of the above two thrust forces, whereby the first line pressure Pl1 is reduced so as to produce the THROTTLE pressure Pth corresponding to the actual opening angle θth of the throttle valve. The relationship between the THROTTLE pressure Pth and the opening angle θth is indicated in the graph of FIG. 5. The THROTTLE pressure Pth is applied through a line 84 to the above-described first and second pressure regulating valves 100, 102, and to a third pressure regulating valve 220.

Figure 6:
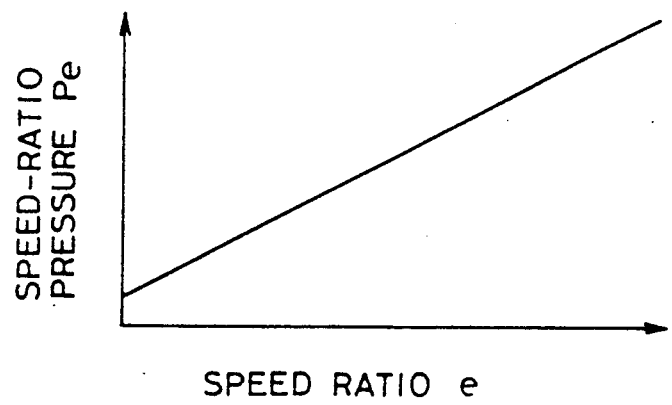
FIG. 6 is a graph indicating an output characteristic of a speed-ratio sensing valve incorporated in the apparatus of FIG. 2.

The speed-ratio sensing valve 182 includes: a sensing rod 192 which slidably contacts the axially movable rotor 50 on the input shaft 30 of the CVT 14 and which is axially displaced by a distance equal to an amount of axial movement of the movable rotor 50; a spring 194 whose biasing force varies as the axial position of the rod 192 is changed; and a valve spool 198 which receives the biasing force of the spring 194 and the second line pressure Pl2. The valve spool 196 is moved to a position of equilibrium of the biasing force of the spring 194 and a thrust force based on the second line pressure Pl2, whereby the amount of discharge flow of the fluid from the second pressure line 82 into the drain is adjusted depending upon the speed-ratio "e" of the CVT 14. For example, as the movable rotor 50 is moved toward the stationary rotor 46 so as to reduce the effective width of the V-groove of the pulley 40 and thereby increase the speed ratio "e", the sensing rod 192 is moved in a direction to compress the spring 194, thereby reducing the rate of flow of the fluid which is supplied from the second pressure line 82 through an orifice 196 and discharged into the drain by a resulting movement of the valve spool 198. As a result, the pressure in a portion of the line 82 downstream of the orifice 196 is increased. This pressure is utilized as the SPEED-RATIO pressure Pe, which increases with an increase in the speed ratio "e" of the CVT 14, as indicated in the graph of FIG. 6. The pressure Pe is applied through a line 86 to the second and third pressure regulating valves 102 and 220.

Figure 8:
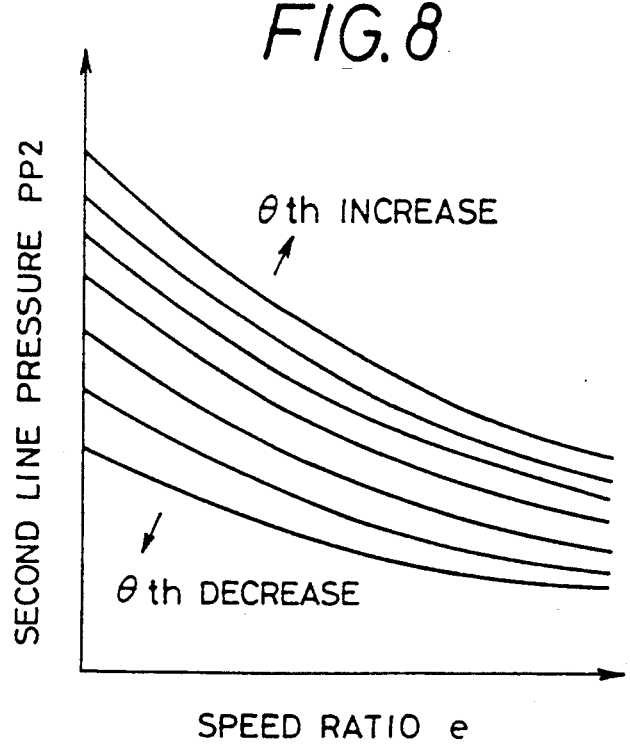
FIG. 8 is a graph showing an ideal relationship of a second line pressure of the apparatus of FIG. 2 with a speed ratio of a CVT of the power transmitting system and an opening angle of a flow restrictor valve of the vehicle.

It will be understood from the above description of the speed-ratio sensing valve 182 that since the SPEED-RATIO pressure Pe is produced by changing the amount of discharge of the fluid supplied from the second pressure line 82 through the orifice 196, the pressure Pe will not exceed the second line pressure Pl2. Further, the second line pressure Pl2 is lowered with an increase in the pressure Pe, by the second pressure regulating valve 102 according to the equation (1) indicated above. Therefore, when the pressure Pe increases up to the level of the second line pressure Pl2, both of the pressures Pe and Pl2 are held constant, as indicated in the graph of FIG. 7, which shows that the lower limit of the second line pressure Pl2 adjusted by the second pressure regulating valve 102 is determined by the SPEED-RATIO pressure Pe, i.e., the speed ratio "e" of the CVT 14. Namely, the present hydraulic arrangement assures the curve of the second line pressure Pl2 (as indicated in FIG. 7) which is similar or approximate to an ideal curve as shown in FIG. 8 that permits the tension of the belt 44 to be maintained at an optimum value. In other words, the present hydraulic arrangement does not require an electromagnetically operated pressure control servo valve controlled by a microcomputer for controlling the second line pressure Pl2. In this respect, the present hydraulic control apparatus provides significant reduction in the cost of manufacture.

The third pressure regulating valve 220 is adapted to produce a third line pressure Pl3 suitable for operating the REVERSE brake 70 and FORWARD clutch 72 of the reversing device 16. This valve 220 includes a valve spool 222 for effecting selective connection and disconnection of the first pressure line 80 to and from a third pressure line 88, a spring sheet 224, a return spring 226, and a plunger 228. The valve spool 222 has a first and a second land 230, 232, between which is formed a chamber 236, which is adapted to receive the third line pressure Pl3 as a feedback pressure through a flow restrictor 234, so that the spool 222 is biased toward its closed position by the pressure Pl3. Adjacent to the first land 230 of the spool 222, there is formed another chamber 240 which receives the SPEED-RATIO pressure Pe through a flow restrictor 238, so that the spool 222 is biased toward the closed position by the pressure Pe. In the third pressure regulating valve 220, a biasing force of the return spring 226 acts on the spool 222 through the spring sheet 224, so that the spool 222 is biased toward its open position by the spring 226. Adjacent to the end face of the plunger 228, there is formed a chamber 242 adapted to receive the THROTTLE pressure Pth, so that the spool 222 is biased toward the open position by the pressure Pth. The plunger 228 has a first land 244, and a second land 246 having a smaller diameter than the first land 244. Between these first and second lands 244, 246, there is formed a chamber 248 adapted to receive the third line pressure Pl3 only when the vehicle runs in the reverse direction with the REVERSE brake 70 placed in the engaged position. In the third pressure regulating valve 220 constructed as described above, the valve spool 222 is moved to a position of equilibrium of forces according to an equation similar to the equation (1), so that the third line pressure Pl3 is controlled to an optimum level based on the SPEED-RATIO and THROTTLE pressures Pe and Pth. The optimum level is a permissible lowest value required to permit the reversing device 16 to transmit received input torque without slipping of the brake 70 or clutch 72.

When the REVERSE brake 70 is placed in the engaged position, the third line pressure Pl3 is applied to the chamber 248, whereby the force biasing the spool 222 toward the open position is increased, to thereby increase the third line pressure Pl3. This arrangement assures optimum torque transmitting capacity of the FORWARD clutch 72 and REVERSE brake 70 during engagement of the clutch 72 or brake 70 to run the vehicle in the forward or reverse direction.

The thus regulated third line pressure Pl3 is applied to the FORWARD clutch 72 or REVERSE brake 70 by means of a shift lever valve 250. This shift lever valve 250 has a valve spool 254 which is moved in response to an operation of the shift lever 252, which has six operating positions, i.e., NEUTRAL "N", PARKING "P", LOW "L", SECOND "S", DRIVE "D" and REVERSE "R". The shift lever valve 250 has an output port 256 and an output port 258. When the shift lever 252 is placed in the NEUTRAL position "N", the third line pressure Pl3 is not supplied from the output ports 256, 258. When the shift lever 252 is placed in one of the LOW, SECOND and DRIVE positions "L", "S" and "D", the third line pressure Pl3 is supplied primarily through the output port 258 to the FORWARD clutch 72, a chamber 450 of the first line pressure reducing control valve 440 (referred to above) and a chamber 432 of a REVERSE INHIBIT valve 420, while at the same time the fluid is discharged from the brake 70. When the shift lever 252 is placed in the REVERSE position "R", the third line pressure Pl3 is supplied through the output port 256 to the third pressure regulating valve 220, lock-up clutch control valve 320, a chamber 452 of the first line pressure reducing control valve 440 and a port 422a of the REVERSE INHIBIT valve 420, so that the pressure Pl3 is applied to the REVERSE brake 70 through the REVERSE INHIBIT valve 420, while at the same time the fluid is discharged from the FORWARD clutch 72. When the shift lever 252 is placed in the PARKING position "P", the fluid is discharged from the brake 70 and clutch 72 at the same time. As indicated in FIG. 2, the spool 254 of the shift lever valve 250 has six operating positions "L", "S", "D", "N", "R" and "P" corresponding to those of the shift lever 252.

Accumulators 340 and 342 are connected to the brake 70 and clutch 72, respectively, for the purpose of slowly raising the pressure applied to the brake and clutch 70, 72, so that the frictionally coupling devices of the brake and clutch may be smoothly engaged. A shift timing valve 210 connected to the clutch 72 functions to prevent a transient excessively high rate of flow of the fluid to the clutch 72, such that a flow restrictor 212 is closed with a rise in the pressure in the cylinder of the clutch 72.

The first and second line pressures Pl1 and Pl2 adjusted by the first and second pressure regulating valves 100, 102, respectively, are applied to the one and the other of the first and second hydraulic cylinders 54, 56 of the CVT 14 through a shift control valve assembly 260, for controlling the speed ratio "e" of the CVT 14. The shift control valve assembly 260 has a directional control valve 262 and a flow control valve 264. These control valves 262, 264 receive through a fourth pressure line 370 a fourth line pressure Pl4 which is produced by a fourth pressure regulating valve 170 based on the first line pressure Pl1.

Figure 9:
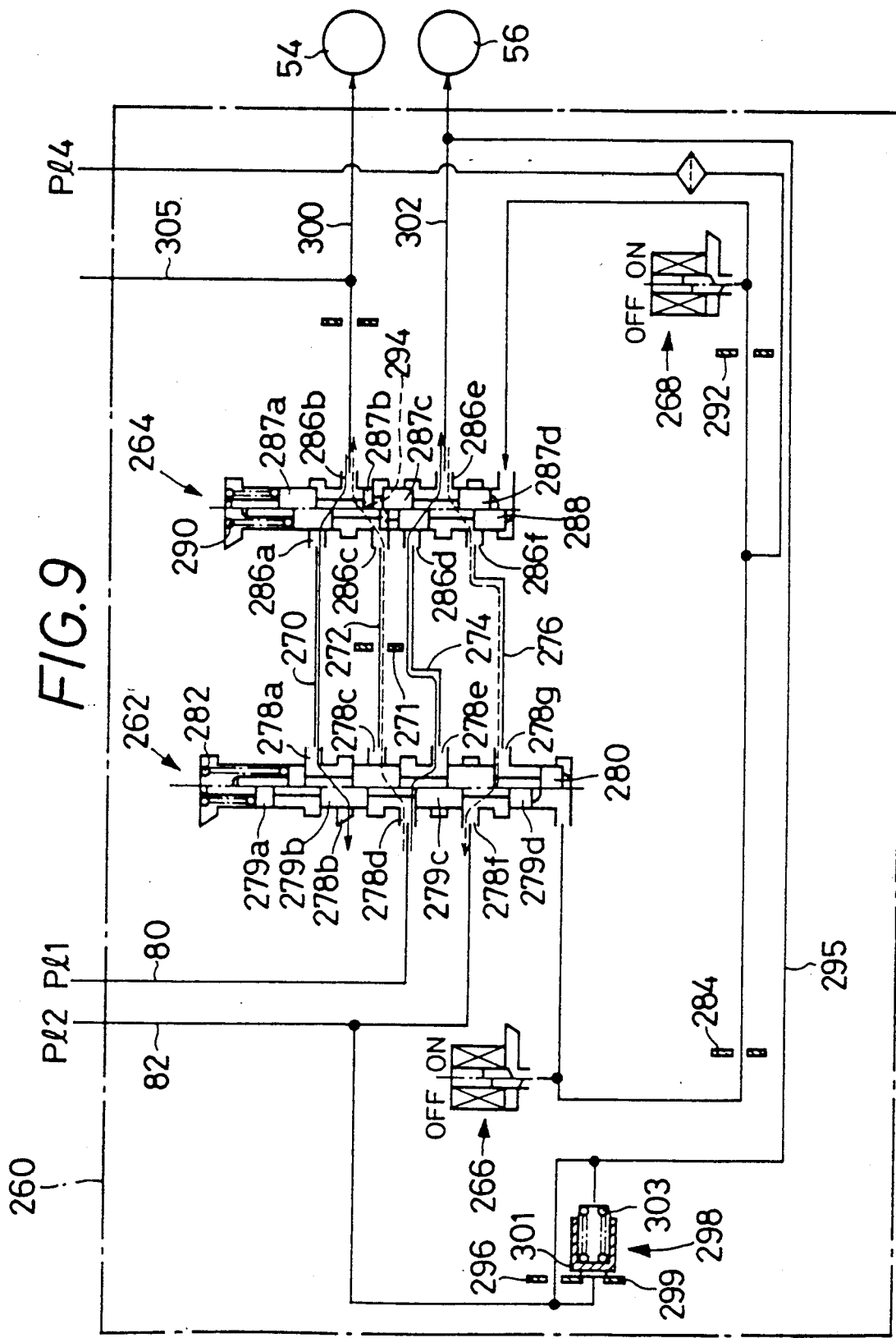
FIG. 9 is a view illustrating in detail a shift control valve assembly of the apparatus of FIG. 2.

Referring to FIG. 9 which shows the details of the shift control valve assembly 260, the directional control valve 262 is a spool valve controlled by a first solenoid-operated valve 266. The valve 262 has ports 278a, 278c, 278e and 278g which communicate with respective first, second, third and fourth connecting lines 270, 272, 274 and 276 that are connected to the flow control valve 264. The line 272 is provided with a flow restrictor 271. The directional control valve 262 further has a drain port 278b communicating with the drain, a port 278d communicating with the first pressure line 80 to receive the first line pressure Pl1, and a port 278f communicating with the second pressure line 82 to receive the second line pressure Pl2. The valve 262 includes a valve spool 280 which is axially slidably movable between a first position corresponding to one end (upper end as viewed in FIG. 9) of an operating stroke thereof, and a second position corresponding to the other end (lower end as viewed in FIG. 9) of the operating stroke. The spool 280 is biased by a spring 282 toward its second position.

The valve spool 280 has four lands 279a, 279b, 279c and 279d which open and close the above-indicated ports of the valve 262. The upper end of the spool 280 on the side of the spring 282 is exposed to the atmosphere, with no hydraulic pressure applied thereto. On the other hand, the lower end of the spool 280 is exposed to the fourth line pressure Pl4 when the first solenoid-operated valve 266 is placed in the OFF or closed position. With the valve 266 placed in the ON or open position, however, the fourth line pressure Pl4 is released through the valve 266 located downstream of a flow restrictor 284, whereby the fourth line pressure Pl4 is not applied to the lower end of the valve spool 280. In this arrangement, while the first solenoid-operated valve 266 is ON, the spool 280 is placed in its second position. In this state, the ports 278a and 278b are connected to each other and the ports 278d and 278e are connected to each other, while the ports 278d and 278c are disconnected from each other and the ports 278f and 278g are disconnected from each other. While the solenoid-operated valve 266 is OFF, the spool 280 is placed in the first position, whereby the ports 278a and 278b are disconnected and the ports 278d and 278e are disconnected, while the ports 278d and 278c are connected and the ports 278f and 278g are connected.

The flow control valve 264 of the shift control valve assembly 260 is a spool valve controlled by a second solenoid-operated valve 268. The valve 264 has ports 286a, 286c, 286d and 286f which communicate with the above-indicated first, second, third and fourth connecting lines 270, 272, 274 and 276. The flow control valve 264 further has a port 286b communicating with the first hydraulic cylinder 54, and a port 286e communicating with the second hydraulic cylinder 56. The valve 264 includes a valve spool 288 which is axially slidably movable between a first position on the side of one end (upper end as viewed in FIG. 9) of an operating stroke thereof, and a second position on the side of the other end (lower end as viewed in FIG. 9) of the operating stroke. The spool 288 is biased by a spring 290 toward its second position.

The valve spool 288 has four lands 287a, 287b, 287c and 287d which open and close the above-indicated ports of the valve 264. As in the valve 262, the upper end of the spool 288 on the side of the spring 290 is exposed to the atmospheric pressure, with no hydraulic pressure applied thereto. On the other hand, the lower end of the spool 288 is exposed to the fourth line pressure Pl4 when the second solenoid-operated valve 268 is placed in the OFF or closed position. With the valve 268 placed in the ON or open position, however, the fourth line pressure Pl4 is released through the valve 268 located downstream of a flow restrictor 292, whereby the fourth line pressure Pl4 is not applied to the lower end of the valve spool 288. In this arrangement, while the second solenoid-operated valve 268 is ON (with the duty cycle set at 100%), the spool 288 is placed in its second position. In this state, the ports 286c and 286b are connected to each other and the ports 286f and 286e are connected to each other, while the ports 286a and 286b are disconnected from each other and the ports 286d and 286e are disconnected from each other. While the solenoid-operated valve 286 is OFF (with the duty cycle set at 0%), the spool 288 is placed in the first position, whereby the ports 286c and 286b are disconnected and the ports 286f and 286e are disconnected, while the ports 286a and 286b are connected and the ports 286d and 286e are connected.

While the second solenoid-operated valve 268 is OFF, the ports 286c and 286b are held in restricted communication with each other through a flow restrictor 294. The second hydraulic cylinder 56 communicates with the second pressure line 82 through a flow restrictor 296 and a check valve 298 which are connected in parallel. These restrictor and check valve 296, 298 are provided to prevent a rapid decrease in the pressure Pout (=Pl1) in the second hydraulic cylinder 56 with the fluid being discharged from the cylinder 56 into the second pressure line 82, when the first line pressure Pl1 is applied to the cylinder 56, during a shift-down operation of the CVT 14 which requires the pressure Pout to be higher than the pressure Pin in the first cylinder 54, or during an engine-braking operation in which torque is transmitted in the direction from the output shaft 38 of the CVT 14 to the input shaft 30.

When the first solenoid-operated valve 266 is turned ON, the pressurized fluid in the first pressure line 80 is fed into the second cylinder 56 through the port 278d, port 278e and a third connecting line 274, port 286d, port 286e and second cylinder line 302, as indicated in solid line in FIG. 9, while the fluid in the first cylinder 54 is discharged to the drain through a first cylinder line 300 and the port 286b, port 286a, first connecting line 270, port 278a and port 278b, as also indicated in solid line in FIG. 9. As a result, the speed ratio "e" of the CVT 14 is reduced so as to reduce the speed of the vehicle, i.e., the CVT 14 is shifted down.

When the first solenoid-operated valve 266 is turned OFF, the pressurized fluid in the first pressure line 80 is fed into the first cylinder 54 through the port 278d, port 278c, second connecting line 272, port 286c, port 286b and first cylinder line 300, as indicated in broken line in FIG. 9, while the fluid in the second cylinder 56 is discharged to the second pressure line 82 through the second cylinder line 302, port 286e, port 286f, fourth connecting line 276, port 278g and port 278f, as also indicated in broken line in FIG. 9. As a result, the speed ratio "e" of the CVT 14 is increased so as to increase the speed of the vehicle, i.e., the CVT 14 is shifted up. A flow restrictor 273 is provided between the port 286b of the flow control valve 264 and a connecting point between the first cylinder line 300 and a branch line 305 leading to the first pressure regulating valve 100.

Figure 10:
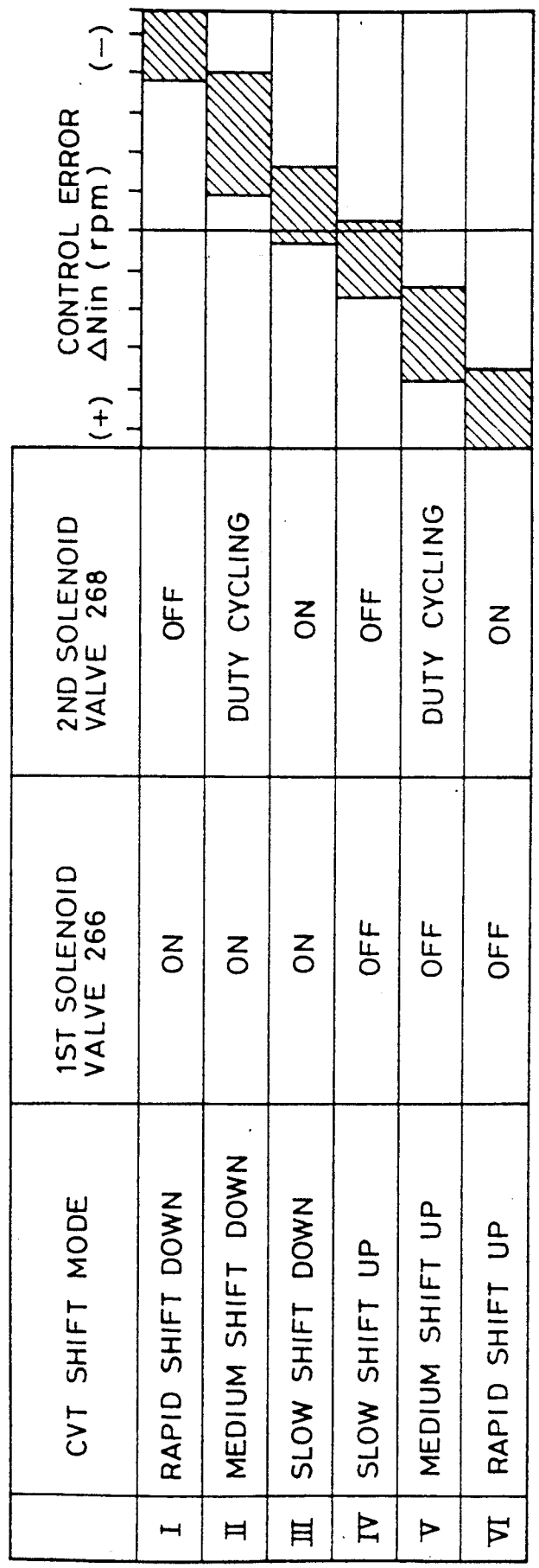
FIG. 10 is a view indicating a relationship between on-off states of a first and a second solenoid valve of the valve assembly of FIG. 9 and a shifting mode of the CVT.

Referring to FIG. 10, there are shown shift modes of the CVT 14 in relation to the operating states (ON and OFF states) of the first and second solenoid-operated valves 266 and 268. The shift modes have different shifting directions and different rates of change in the speed ratio "e". Namely, the shift mode IV is established when both of the first and second solenoid-operated valves 266, 268 are OFF. In this shift mode IV, the pressurized fluid in the first pressure line 80 is fed into the first cylinder 54 through a flow restrictor 294 formed in through the valve spool 288 of the flow control valve 264, while the fluid in the second cylinder 56 is discharged at a relatively low rate into the second pressure line 82 through the flow restrictor 296. The shift mode III is established when the first and second solenoid-operated valves 266, 268 are both ON. In this mode III, the fluid in the second pressure line 82 is fed into the second cylinder 56 through a flow restrictor 296 provided in the by-pass line 295, and through the check valve 298. The flow restrictor 296 and check valve 298 are disposed in parallel with each other. At the same time, the fluid in the first cylinder 54 is discharged at a relatively low rate through a small clearance which is purposely or inherently formed or provided between the piston and the mating sliding surface of the cylinder 54.

The by-pass line 295 provided between the second cylinder 56 and the second pressure line 82 as described above effectively prevents or minimizes a phenomenon of pulsation of the pressure Pout in the second cylinder 56 which would occur in synchronization with the duty cycling operation of the flow control valve 264. More specifically, the upper peak of the spike of the pressure Pout is released through the flow restrictor 296, while the lower peak of the pressure Pout is compensated for by the check valve 298. The check valve 298 includes a valve seat 299 having a flat seat surface, a valve member 301 having a flat operating surface which is abutable on the valve seat 299, and a spring 303 for biasing the valve member 301 against the seat 299. This check valve 298 is adapted to be opened when a pressure difference across the valve exceeds about 0.2 kg/cm².

Figure 11:
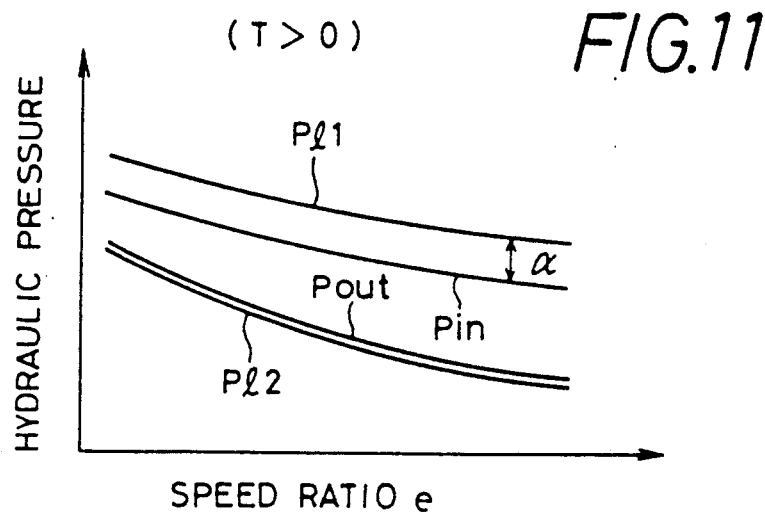
FIGS. 11, 12 and 13 are graphs indicating relationships between the speed ratio of the CVT and hydraulic pressures at different locations of the apparatus of FIG. 2, where the vehicle is running in normal, engine-brake and non-load running conditions, respectively.
Figure 12:
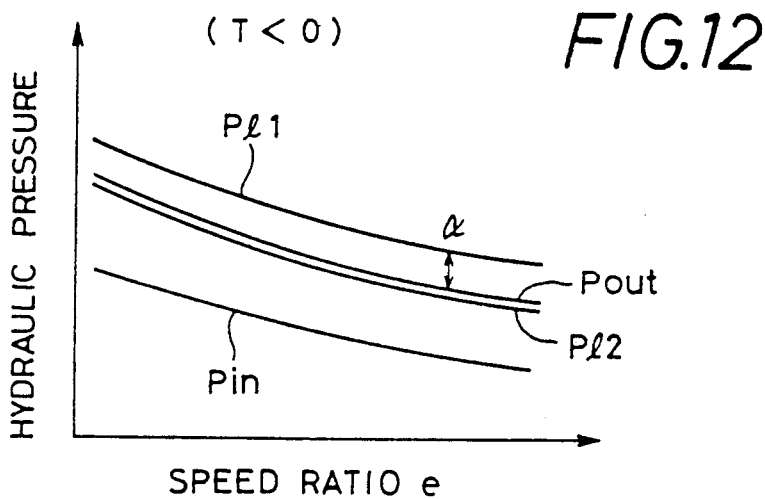
Figure 13:
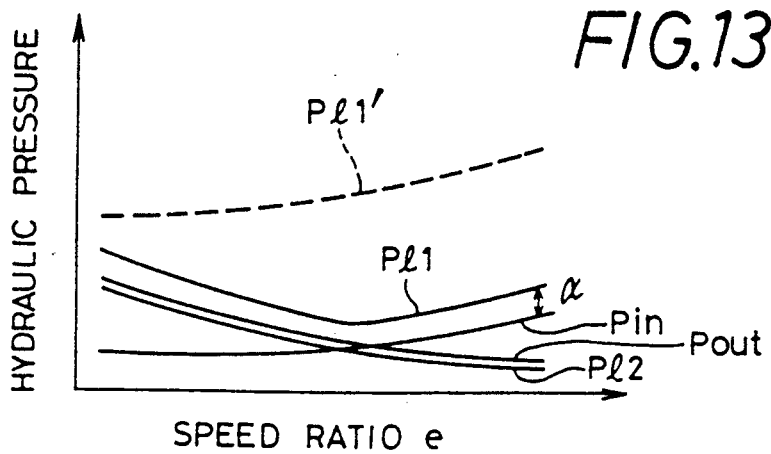

In the CVT 14, it is desirable that the first line pressure Pl1 have an optimum value with respect to the second line pressure Pl2 and the cylinder pressures Pin and Pout, as indicated in FIG. 11 when torque T is transmitted through the CVT 14 in the forward direction from the input shaft 30 toward the output shaft 38 (when the torque T is positive), and as indicated in FIG. 12 when the torque T is transmitted in the reverse direction from the output shaft 30 toward the input shaft 30 as in an engine-brake running of the vehicle (when the torque T is negative). The optimum value of the first line pressure Pl1 as shown in FIGS. 10 and 11 varies with the speed ratio "e" of the CVT 14, with the torque of the input shaft 30 is constant at a given level. In the present embodiment wherein the first and second hydraulic cylinders 54, 56 have the same pressure-receiving area, the pressure Pin in the first cylinder 54 is higher than the pressure Pout in the second cylinder 56 during the positive-torque running of the vehicle, as indicated in FIG. 11. On the other hand, the pressure Pout is higher than the pressure Pin during the negative-torque running (engine-brake running) of the vehicle, as indicated in FIG. 12. That is, the pressure in the driving side cylinder 54, 56 is higher than the pressure in the driven side cylinder 54, 56. In the positive-torque running of FIG. 11, the pressure Pin in the driving side cylinder 54 provides a thrust which determines the speed ratio "e" of the CVT 14. In view of this, the first line pressure Pl1 is desirably adjusted so as to be higher than the pressure Pin by an extra amount α which is a minimum value required to establish the desired speed ratio "e" with a minimum power loss. However, it is impossible to adjust the first line pressure Pl1 based on one of the pressures Pin and Pout of the two cylinders 54, 56. In view of this, the first pressure regulating valve 100 is provided with the second plunger 148, so that the valve spool 140 of the valve 100 receives a biasing force based on a higher one of the pressure Pin and the second line pressure Pl2. According to this arrangement, the first line pressure Pl1 is determined based on the higher one of the pressures Pin and Pl2 whose curves intersect each other as indicated in FIG. 13, i.e., based on the higher pressure Pin or Pl2 while the vehicle is running with no load applied to the CVT 14. More precisely, the optimum first line pressure Pl1 is determined by adding the above-indicated required minimum extra value α, so that the first line pressure Pl1 is a minimum level required to obtain the desired speed ratio "e" with a minimum power loss. A curve indicated in broken line in FIG. 13 represents the first line pressure Pl1' where the first pressure regulating valve 100 is not provided with the second plunger 148. This curve indicates that the first line pressure Pl1' is unnecessarily high when the desired speed ratio "e" is relatively high.

Figure 14:
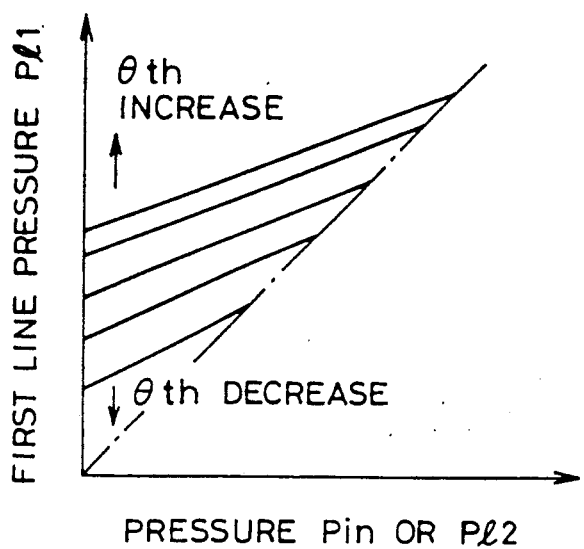
FIG. 14 is a graph indicating an output characteristic of the first pressure regulating valve of FIG. 4, i.e., a relationship between a first line pressure and a second line pressure or a pressure in a first hydraulic cylinder of the CVT.

As indicated above, the extra value α is a minimum value which is required to change the speed ratio "e" of the CVT 14 over its entire range available. It will be understood from the above equation (2) that the first line pressure Pl1 increases in relation to the THROTTLE pressure Pth, since the pressure-receiving areas of the relevant elements of the first pressure regulating valve 100 and the biasing force of the spring 144 are so determined. Although the first line pressure Pl1 adjusted by the first pressure regulating valve 100 increases with the pressure Pin or Pl2 and the THROTTLE pressure Pth, the pressure Pl1 is saturated at a highest value which varies with the THROTTLE pressure Pth ($\theta$th), as indicated in FIG. 14. This arrangement prevents an excessive rise in the first line pressure Pl1 (higher than the pressure Pin in the first cylinder 54 by the extra value $\alpha$), even if the pressure Pin increases while the speed ratio "e" is the highest value with the minimum width of the V-groove of the first pulley 40 (while the movement of the movable rotor 50 is mechanically prevented).

The fluid discharged from the port 150b of the first pressure regulating valve 100 is fed into the lock-up clutch line 92, and directed to a lock-up pressure regulating valve 310 for producing as a LOCK-UP CLUTCH pressure Pcl suitable for operating the lock-up clutch 36 of the fluid coupling 12. The lock-up pressure regulating valve 310 has a valve spool 312 which receives as a feedback pressure the LOCK-UP CLUTCH pressure Pcl. The spool 312 is biased by this feedback pressure Pcl toward its open position. The valve 310 further has a spring 314 for biasing the spool 312 to the closed position, a chamber 316 to which is applied the LOCK-UP CLUTCH pressure Pcl through a rapid release valve 400 (which will be described) upon rapid releasing of the lock-up clutch 36, and a plunger 317 which receives the pressure in the chamber 316 to thereby bias the spool 312 toward the closed position. The valve spool 312 is moved to a position of equilibrium between a thrust based on the feedback pressure Pcl and a biasing force of the spring 314, whereby the LOCK-UP CLUTCH pressure Pcl in the lock-up clutch line 92 is suitably adjusted. When the LOCK-UP CLUTCH pressure Pcl is applied to the chamber 316 upon rapid releasing of the lock-up clutch 36, the pressure Pcl is further raised to further accelerate the releasing of the lock-up clutch 36. The fluid discharged from the lock-up pressure regulating valve 310 is supplied to various portions of the power transmitting system through a flow restrictor 318 and a lubrication line 94, and is returned to the suction line 78 of the oil pump 74.

The thus regulated LOCK-UP CLUTCH pressure Pcl is applied selectively to the engaging and releasing lines 322, 324 of the fluid coupling 12 through a lock-up clutch control valve 320, whereby the lock-up clutch 36 is engaged and disengaged or released. The lock-up clutch control valve 320 has a valve spool 326 for selective connection of the lock-up clutch line 92 with the engaging and releasing lines 322, 324. The spool 326 is biased by a spring 328 toward a releasing position for releasing the lock-up clutch 36. Adjacent to the upper end of the spool 326 (on the side of the spring 328), there is formed a chamber 334 which receives the third line pressure Pl3 supplied from the output port 256 of the shift lever valve 250 through a line 257 only when the shift lever 252 is placed in the REVERSE position "R". With the shift lever 252 placed in the other positions, the chamber 334 is drained. Adjacent to the lower end of the spool 326 remote from the spring 328, there is formed a chamber 332 which receives a pilot pressure Psol3 when a normally open third solenoid-operated valve 330 is placed in the ON or closed position. That is, when the third solenoid-operated valve 330 is ON, the pressure in a portion of the line connected to the chamber 332 which is downstream of a flow restrictor 331 is equal to the LOCK-UP CLUTCH pressure Pcl and is used as the pilot pressure Psol3. However, when the valve 330 is OFF or open, the above-indicated portion of the line connected to the chamber 332 is drained, whereby the chamber 332 is drained. The flow restrictor 331 and the third solenoid-operated valve 330 constitute means for producing the pilot pressure Psol3, which is applied to the chamber 332 of the lock-up clutch control valve 320, and to the second line pressure reducing control valve 380, lock-up clutch rapid release valve 400, and REVERSE INHIBIT valve 420.

While the third solenoid-operated valve 330 is ON with the shift lever 252 placed in one of the positions other than the REVERSE position "R", therefore, the pilot pressure Psol3 is applied to the chamber 332 of the valve 320, while the chamber 334 is exposed to the atmospheric pressure, whereby the spool 326 is moved to its stroke end on the side of the spring 328. Consequently, the fluid in the lock-up clutch line 92 is supplied to the engaging line 322, and the lock-up clutch 36 is engaged. With the valve 330 turned OFF, on the other hand, the chamber 332 is exposed to the atmospheric pressure, and the spool 326 is moved under the biasing action of the spring 328, to the other stroke end (lower end as viewed in FIG. 2). Consequently, the fluid in the line 92 is supplied to the releasing line 324, and the lock-up clutch 36 is released.

When the shift lever 252 is operated to the REVERSE position "R", the third line pressure Pl3 is applied to the chamber 334, whereby the spool 326 is moved to its lower stroke end (as viewed in FIG. 2) to release the lock-up clutch 36, irrespective of the ON-OFF state of the third solenoid-operated valve 330, since a sum of the biasing force of the spring 328 and a force based on the pressure Pl3 exceeds a force based on the pilot pressure Psol3 acting on the spool 326.

The fluid discharged through a flow restrictor 336 upon engagement of the lock-up clutch 36, and the fluid which is returned from the clutch 36 through the engaging line 322 and discharged from the valve 320 upon releasing of the clutch 36, are regulated by a cooler pressure control valve 338 so that the pressure of the discharged fluid is lowered to a suitable level. The fluid whose pressure is thus adjusted by the valve 338 is returned to an oil reservoir (not shown) via an oil cooler 339.

There will next be described the manner in which the back pressures of the accumulators 342, 340 for the FORWARD clutch 72 and REVERSE brake 70 are controlled.

Figure 15:
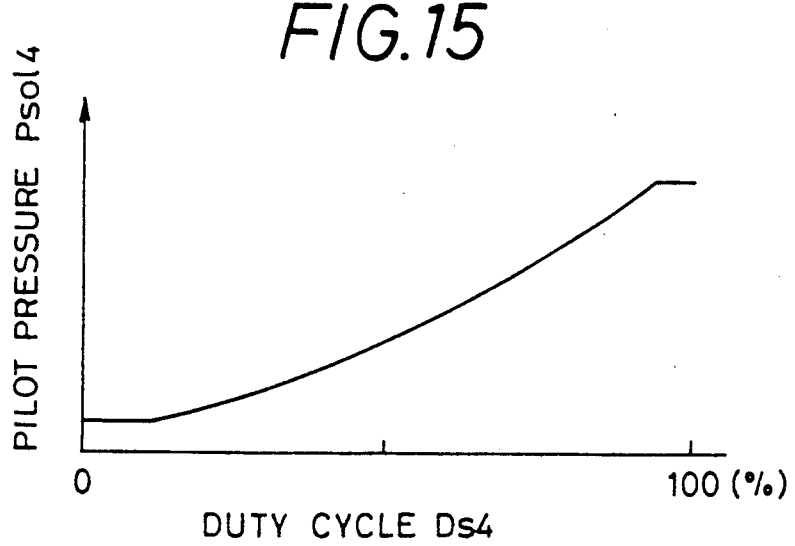
FIG. 15 is a graph indicating a relationship between the duty cycle of a fourth solenoid valve of the apparatus of FIG. 2 and a pilot pressure continuously changed with the duty cycle.
Figure 16:
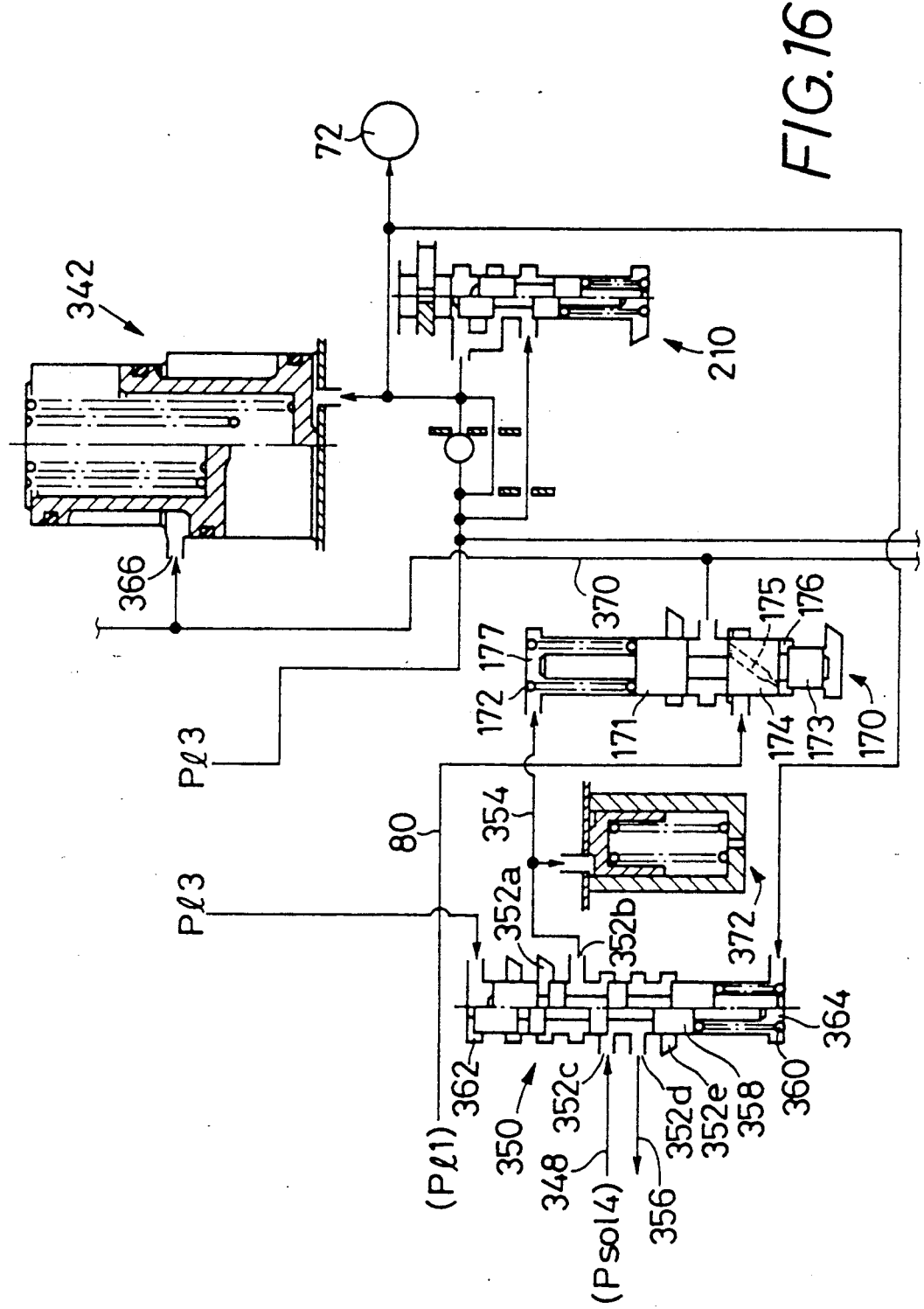
FIG. 16 is a view showing in detail a pilot pressure switch valve and the fourth solenoid valve of the apparatus of FIG. 2.

The lock-up clutch line 92 is connected through a flow restrictor 344 to a normally open fourth solenoid-operated valve 346, so that the pressure downstream of the restrictor 344 is regulated as a pilot pressure Psol4 in relation to the duty cycle Ds4 of the solenoid-operated valve 346, as indicated in FIG. 15. Namely, the restrictor 344 and the fourth solenoid-operated valve 346 constitute means for producing the pilot pressure Psol4. This pilot pressure Psol4 thus adjusted by the controlled duty cycle Ds4 of the solenoid-operated valve 246 is applied to a pilot pressure switch valve 350 through a line 348. As shown in FIG. 16, the switch valve 350 has a drain port 352a, a port 352b communicating with a line 354, a port 352c communicating with the line 348, a port 352d communicating with a line 356, and a drain port 352e. The switch valve 350 further has a valve spool 358 slidably movable between a first position corresponding to one end (upper end as viewed in FIG. 16) of the operating stroke, and a second position corresponding to the other end (lower end as viewed in FIG. 16) of the operating stroke. The spool 358 is biased by a spring 360 toward the first position. Adjacent to the upper end of the spool 358, there is formed a chamber 362 which is always exposed to the third line pressure Pl3. Adjacent to the lower end of the spool 358 (on the side of the spring 360), there is formed a chamber 364 adapted to receive the pressure in the FORWARD clutch 72. When the shift lever 252 is placed in one of the PARKING, REVERSE and NEUTRAL positions "P", "R" and "N", the hydraulic cylinder of the FORWARD clutch 72 is drained by the shift lever valve 250, whereby the chamber 364 is drained. As a result, the valve spool 358 is moved to the second position by the third line pressure Pl3 in the chamber 362, whereby the ports 352c and 352b are connected to each other, while the ports 352d and 352e are connected to each other. Consequently, the pilot pressure Psol4 is applied to a chamber 177 of the fourth pressure regulating valve 170 through the line 354, and the line 356 is drained. When the shift lever 252 is operated from the NEUTRAL position "N" to the DRIVE, SECOND or LOW position "D", "S" or "L", however, the pressure in the cylinder of the FORWARD clutch 72 is initially raised as a function of time under a pressure absorbing action of the accumulator 342, so that the pressure in the clutch 72 reaches the third line pressure Pl3 when the clutch 72 is completely engaged. It will be understood, therefore, that the pilot pressure Psol4 in the line 348 is applied to the fourth pressure regulating valve 170 via the pilot pressure switch valve 350 before the clutch 72 is completely engaged or the pressure in the chamber 364 reaches the third line pressure Pl3. After the clutch 72 is fully engaged (after the pressure in the chamber 364 is elevated up to the level of the third line pressure Pl3), the spool 358 is moved to the first position, whereby the ports 352b and 352a are connected to each other while the ports 352c and 352d are connected to each other. As a result, the line 354 is drained, and the pilot pressure Psol4 in the line 348 is applied to the second line pressure reducing control valve 380 and lock-up clutch rapid release valve 400, through the switch valve 350 and line 356.

The back pressures of the accumulators 340, 342 are controlled in order to limit a rate of rise in the pressures in the cylinders of the clutch 72 and brake 70, for thereby reducing engaging shocks of the clutch 72 and brake 70, when the shift lever 252 is operated from the NEUTRAL position "N" to the DRIVE position "D" or REVERSE position "R". To this end, the fourth pressure regulating valve 170 is adapted to regulate the fourth line pressure Pl4 which is applied through a fourth pressure line 370 to back pressure ports 366 and 368 of the accumulators 342, 340 for the clutch 72 and brake 70. That is, the fourth pressure regulating valve 170 functions to control the pressure absorbing functions of the accumulators 342, 340, so as to minimize the engaging shocks of the clutch 72 and brake 70.

The fourth pressure regulating valve 170 has a valve spool 171 for selective connection and disconnection of the first pressure line 80 to and from the fourth pressure line 370. The spool 171 is biased by a spring 172 toward its open position, and has a first land 173 and a second land 174. Between the lands 173, 174, there is formed a chamber 176 which is adapted to receive as a feedback pressure the fourth line pressure Pl4 through a flow restrictor 175. Adjacent to one end of the spool 171 on the side of the spring 172, there is formed a chamber 177 adapted to receive the pilot pressure Psol4, such that the pressure Psol4 biases the spool 171 toward the open position. The other end of the spool 171 is exposed to the atmospheric pressure. In the thus constructed fourth pressure regulating valve 170, the spool 171 is moved to a position of equilibrium of a valve closing force based on the feedback pressure corresponding to the fourth line pressure Pl4, and a sum of the valve opening biasing force of the spring 172 and a valve opening force based on the pilot pressure Psol4. As a result, the fourth line pressure Pl4 is adjusted in relation to the pilot pressure Psol4.

Figure 17:
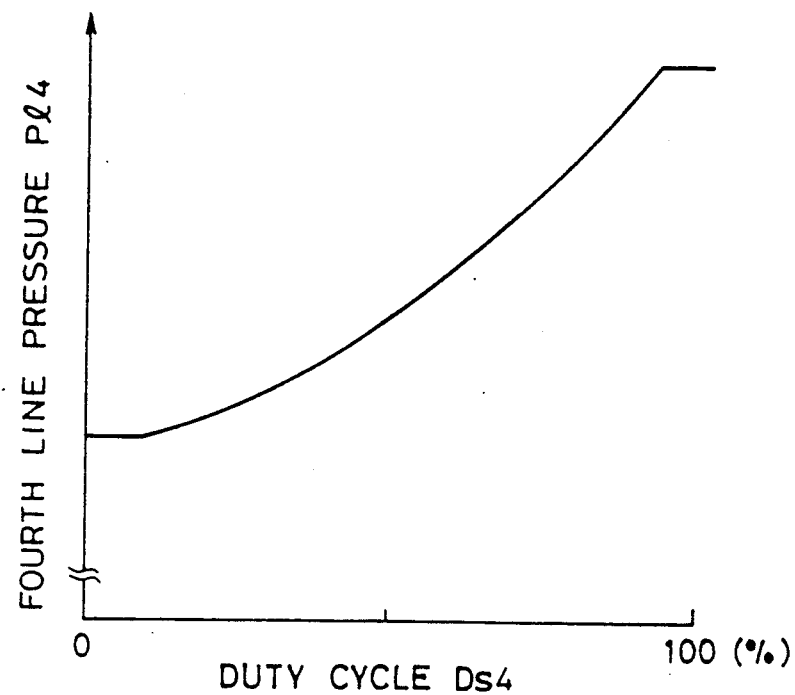
FIG. 17 is a graph indicating a relationship between the duty cycle of the fourth solenoid valve and a fourth line pressure continuously changed with the duty cycle.

Described more specifically, while the pilot pressure Psol4 acts on the fourth pressure regulating valve 170 through the pilot switch valve 350 upon shifting of the shift lever 252 from the position "N" to the position "D" or "R", the fourth line pressure Pl4 is regulated in relation to the duty cycle Ds4 of the fourth solenoid-operated valve 346, as indicated in FIG. 17. In other words, the duty cycle Ds4 of the valve 346 is controlled so as to control the back pressures of the accumulators 342, 340, for minimizing the engaging shocks of the clutch 72 and brake 70. When the pressure in the cylinder of the clutch 72 rises to the third line pressure Pl3, the pilot pressure Psol4 which has been applied to the fourth pressure regulating valve 170 is cut off by the pilot switch valve 350, whereby the chamber 177 is exposed to the atmosphere, and the fourth line pressure Pl4 is regulated to a relatively low level in the neighborhood of 4 kg/cm$^2$, which corresponds to the biasing force of the spring 172 biasing the spool 171 toward the open position. The thus regulated fourth line pressure Pl4 is used primarily for controlling the directional and flow control valves 262, 264 of the shift control valve assembly 260. An accumulator 372 is connected to the line 354, for the purpose of absorbing the pulsation of the pilot pressure Psol4 which would arise in relation to the frequency of the drive pulses to activate the fourth solenoid-operated valve 346 under a controlled duty cycle.

Referring back to FIG. 2, the second line pressure reducing control valve 380 is provided to protect the transmission belt 44 against an overload due to a pressure rise in the driven side hydraulic cylinder 54, 56, which pressure rise is caused by a centrifugal force during rotation of the driven side pulley 40, 42. Described more specifically, when the vehicle is running at a high speed with the output shaft 38 of the CVT 14 rotating at a high speed, the control valve 380 primarily functions to reduce the second line pressure Pl2 applied to the driven side cylinder, for example, the second cylinder 56. The control valve 380 has a port 382a communicating with a line 356, a port 382b communicating with the pressure-reducing chamber 136 of the second pressure regulating valve 102 through a line 384, and a drain port 382c. The valve 380 further has a valve spool 386 which is slidably movable between a first position corresponding to one end (upper end as viewed in FIG. 2) of the operating stroke, and a second position corresponding to the other end (lower end as viewed in FIG. 2) of the stroke. This valve spool 386 is biased by a spring 388 toward the second position. When the third solenoid-operated valve 330 is OFF (open), a chamber 390 formed adjacent to the lower end of the spool 386 corresponding to the second position is drained, whereby the spool 386 is moved to the second position. As a result, the ports 382b and 382c are connected to each other, and the chamber 136 of the second pressure regulating valve is drained, whereby the second line pressure Pl2 is regulated according to the equation (1) indicated above.

When the third solenoid-operated valve 330 is turned ON (closed), on the other hand, the pilot pressure Psol3 (LOCK-UP CLUTCH pressure Pcl) is applied to the chamber 390 of the control valve 380, and the spool 386 is moved to the first position. As a result, the ports 382a and 382b are connected to each other. If the fourth solenoid-operated valve 346 is ON (closed) and the FORWARD clutch 72 is engaged at this time, the LOCK-UP CLUTCH pressure Pcl is applied to the chamber 136 of the second pressure regulating valve 102 through the line 356, ports 382a, 382b, and line 384. Since this LOCK-UP CLUTCH pressure Pcl biases the spool 110 of the valve 102 toward the closed position, the second line pressure Pl2 is regulated according to the following equation (3):

$$Pl2 = [A4 \cdot Pth + W - A1 \cdot Pe - (A2 - A1) \cdot Pcl]/(A3 - A2) \quad (3)$$

Figure 18:
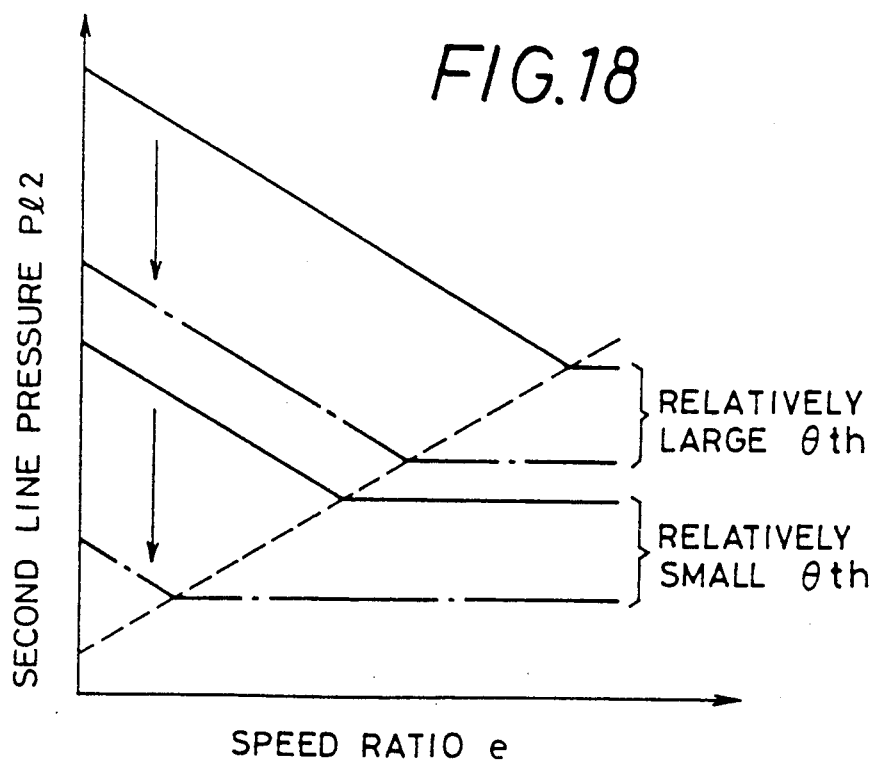
FIG. 18 is a graph indicating the second line pressure which varies with the running speed of the vehicle.

The second line pressure Pl2 as regulated according to the above equation (3) as indicated in one-dot chain lines in FIG. 18 is lowered with respect to the normally regulated second line pressure as indicated in solid lines. Namely, when the vehicle running speed exceeds a predetermined upper limit, the third and fourth solenoid-operated valves 330 and 346 are both turned ON (closed) to lower the second line pressure Pl2. Thus, the second line pressure reducing control valve 380 eliminates or minimizes an adverse effect of an excessive rise in the pressure in the second cylinder 56 (driven side cylinder) due to the centrifugal force when the vehicle speed is relatively high. In other words, the control valve 380 prevents an excessive increase in the tension of the transmission belt 44 even when the driven side shaft (output shaft 38) of the CVT 14 is rotated at a relatively high speed.

It is noted that even when the third solenoid-operated valve 330 is ON (energized), the second line pressure Pl2 is normally regulated according to the equation (1), rather than the equation (3), if the fourth solenoid-operated valve 346 remains OFF.

There will next be described the lock-up clutch rapid release valve 400 provided to improve the releasing response of the lock-up clutch 36 of the fluid coupling 12.

The rapid release valve 400 has a port 402a communicating with the lock-up clutch line 92, a port 402b communicating with the chamber 316 formed adjacent to the end face of the plunger 317 of the lock-up pressure regulating valve 310, a drain port 402c, a port 402d communicating with the engaging line 322 leading to the lock-up clutch 36, a valve spool 406 slidably movable between a first position corresponding to one end (upper end) of the operating stroke and a second position corresponding to the other end (lower end) of the operating stroke, and a spring 408 biasing the spool 406 toward the second position. Adjacent to the lower end of the spool 406, there is formed a chamber 410 adapted to receive the LOCK-UP CLUTCH pressure Pcl when the fourth solenoid-operated valve 346 is ON with the FORWARD clutch 72 being engaged. When the valve 346 is OFF, the chamber 410 is drained. Adjacent to the upper end of the spool 406 on the side of the spring 408, there is formed a chamber 412 adapted to receive the pilot pressure Psol3 (LOCK-UP CLUTCH pressure Pcl) when the third solenoid-operated valve 330 is ON. The chamber 412 is drained when the valve 330 is OFF.

The lock-up clutch rapid release valve 400 is controlled by the third and fourth solenoid-operated valves 330, 346, such that the valve spool 406 is moved to the first position only when the third solenoid-operated valve 330 is OFF while the fourth solenoid-operated valve 346 is ON. In the first position, the LOCK-UP CLUTCH pressure Pcl is applied to the chamber 316 of the lock-up pressure regulating valve 310 through the ports 402a, 402b and line 404, whereby the LOCK-UP CLUTCH pressure Pcl is increased while the fluid discharged from the engaging chamber 33 of the fluid coupling 12 through the engaging line 322 is fed to the drain through the ports 402d and 402c. As a result, the lock-up clutch 36 is rapidly released or disengaged.

When the third and fourth solenoid-operated valves 330, 346 are placed in the other combination of operating states, the spool 406 of the rapid release valve 400 is placed in the second position. In this position, not only the valve 400 functions to reduce the resistance to flow of the fluid out of the engaging chamber 33 of the fluid coupling 12, but also the lock-up pressure regulating valve 310 functions to increase the LOCK-UP CLUTCH pressure Pcl applied to the releasing chamber 35 of the fluid coupling 12. This arrangement therefore permits a rapid releasing operation of the lock-up clutch 36 when the third solenoid-operated valve 330 is turned OFF and the fourth solenoid-operated valve 346 is turned ON. In the present embodiment, the engaging chamber 33 of the fluid coupling 12 is normally drained through a discharge passage which includes the engaging line 322, the lock-up clutch control valve 320 and the cooler 339. Upon rapid releasing of the lock-up clutch 36, however, the engaging chamber 33 is drained through the engaging line 322, and the ports 402d, 402c of the lock-up clutch rapid release valve 400.

The REVERSE INHIBIT valve 420 is provided to inhibit the reversing device 16 from being placed in the reverse position with the REVERSE brake 70 engaged, when the vehicle is running in the forward direction. This valve 420 has a port 422a adapted to receive the third line pressure Pl3 from the output port 256 of the shift lever valve 250 when the valve 250 is placed in the REVERSE position "R". The REVERSE INHIBIT valve 420 further has a port 422b communicating with the cylinder of the REVERSE brake 70 through a line 423, and a drain port 422c. The valve 420 includes a valve spool 424 slidably movable between a first position corresponding to one end (upper end) of the operating stroke and a second position corresponding to the other end (lower end) of the operating stroke. The spool 424 is biased by a spring 426 toward the first position. Adjacent to the upper end of the spool 424, there is formed a chamber 428 adapted to receive the pilot pressure Psol3 (LOCK-UP CLUTCH pressure Pcl) through the line 430 when the third solenoid-operated valve 330 is ON. When the valve 330 is OFF, the chamber 428 is drained. Adjacent to the lower end of the spool 424 (on the side of the spring 426), there is formed a chamber 432 adapted to receive the third line pressure Pl3 from the output port 258 of the shift lever valve 250 when the valve 250 is placed in the DRIVE, SECOND or LOW position "D", "S", "L".

In the REVERSE INHIBIT valve 420, the valve spool 424 is moved to the second position when the third line pressure Pl3 in the chamber 432 is released and the pilot pressure Psol3 (LOCK-UP CLUTCH pressure Pc1) is applied to the chamber 428. In this second position, the ports 422a and 422b are disconnected from each other, to thereby cut off the fluid supply to the REVERSE brake 70, while the ports 422c and 422b are connected to each other, to thereby cause the cylinder of the brake 70 to be drained. As a result, the REVERSE brake 70 is inhibited from being engaged. Namely, the REVERSE INHIBIT valve 420 prevents the reversing device 16 from being placed in the reverse position, even when the shift lever 252 is erroneously moved from the DRIVE position "D" to the REVERSE position "R" past the NEUTRAL position "N" while the vehicle is running in the forward direction. In this event, an electronic control device 460 (which will be described by reference to FIG. 1) commands the third solenoid-operated valve 330 to be turned ON, to thereby cause the reversing device 16 to be placed in the neutral position.

The first line pressure reducing control valve 440 is provided to lower the first line pressure Pl1 by a suitable amount to thereby reduce the operating noise of the belt 44, when the shift lever valve 250 (shift lever 252) is placed in the NEUTRAL or PARKING position "N" or "P". This control valve 440 has a drain port 442a, a port 442b communicating with the chamber 160 between the first and second lands 152, 154 of the first pressure regulating valve 100 through the line 161, a port 442c communicating with the second pressure line 82, a plunger 444, and a valve spool 446 for selective connection and disconnection of the second pressure line 82 to and from the chamber 160 of the valve 100. The spool 446 is biased by a spring 448 toward its open position. Adjacent to the lower end face of the plunger 444, there is formed a chamber 450 which communicates with the output port 258 of the shift lever valve 250 from which the third line pressure Pl3 is applied when the shift lever valve 250 is placed in the DRIVE, SECOND or LOW position "D", "S", "L". Between the plunger 444 and the spool 446, there is formed a chamber 452 which communicates with the output port 256 of the valve 250 from which the third line pressure Pl3 is applied when the valve 250 is placed in the REVERSE position "R".

When the shift lever valve 250 is placed in one of the positions "D", "S", "L" and "R", the spool 446 of the control valve 440 is located at the upper stroke end, whereby the chamber 160 of the first pressure regulating valve 100 is exposed to the atmosphere through the drain port 442a. As a result, the first line pressure Pl1 is normally regulated according to the equation (2) indicated above. When the shift lever valve 250 is operated to the NEUTRAL or PARKING position "N", "P", on the other hand, the spool 446 is moved to its lower stroke end, and the second line pressure Pl2 is applied to the chamber 160 of the first pressure regulating valve 100. As a result, the spool 140 of the valve 100 is biased toward the open position by the second line pressure Pl2 in the chamber 160, whereby the first line pressure Pl1 is lowered. Thus, the tension of the belt 44 is minimized to the extent that prevents the belt 44 from slipping on the pulleys 40, 42. Accordingly, the operating noise of the belt 44 is reduced, and the durability of the belt is improved.

Referring back to FIG. 1, there is indicated the above-indicated electronic control device 460, which serves as control means for controlling the first, second, third and fourth solenoid-operated valves 266, 268, 330, 346 incorporated in the hydraulic circuit shown in FIG. 2, for controlling the speed ratio "e" of the CVT 14, the lock-up clutch 36 of the fluid coupling 12, and the other elements of the power transmitting system of the vehicle. The electronic control device 460 includes a so-called microcomputer which incorporates a central processing unit (CPU), a random-access memory and a read-only memory, as well known in the art.

The control device 460 receives various signals from various sensors, such as: a VEHICLE speed sensor 462 disposed to detect the rotating speed of the drive wheels 24, and generating a vehicle speed signal representative of the detected speed, i.e., a running speed V of the vehicle; an INPUT SHAFT speed sensor 464 disposed to detect the rotating speed of the input shaft 30 of the CVT 14, and generating an input shaft speed signal representative of the detected speed Nin of the input shaft 30; an OUTPUT SHAFT speed sensor 466 disposed to detect the speed of the output shaft 38 of the CVT 14, and generating an output shaft speed signal representative of the detected speed Nout of the output shaft 38; a THROTTLE sensor 468 disposed to detect an angle of opening of the throttle valve disposed in a suction pipe of the engine 10, and generating a throttle signal representative of the opening angle $\theta$th of the throttle valve; a SHIFT LEVER sensor 470 disposed to detect the currently selected operating position of the shift lever 252, and generating a signal representative of the currently selected position Ps of the shift lever 252; and a BRAKE switch 472 disposed to detect an operation of a brake pedal of the vehicle, and generating a signal indicative of the operation of the brake pedal. The CPU of the electronic control device 460 processes these input signals according to control programs stored in the ROM, while utilizing a temporary data storage function of the RAM, and applies appropriate drive or control signals to the first, second, third and fourth solenoid-operated valves 266, 268, 330 and 346.

Upon application of power to the control device 460, a main control routine is executed after the initialization of the device. In the main control routine, the speeds Nin and Nout of the input and output shafts 30, 38, speed ratio "e" of the CVT 14, the vehicle running speed V and other running parameters of the vehicle are calculated based on the input signals received from the various sensors indicated above. Further, the lock-up clutch 36 and the CVT 14 are suitably controlled, in a controlled sequence or as needed, based on the received input signals.

Figure 19:
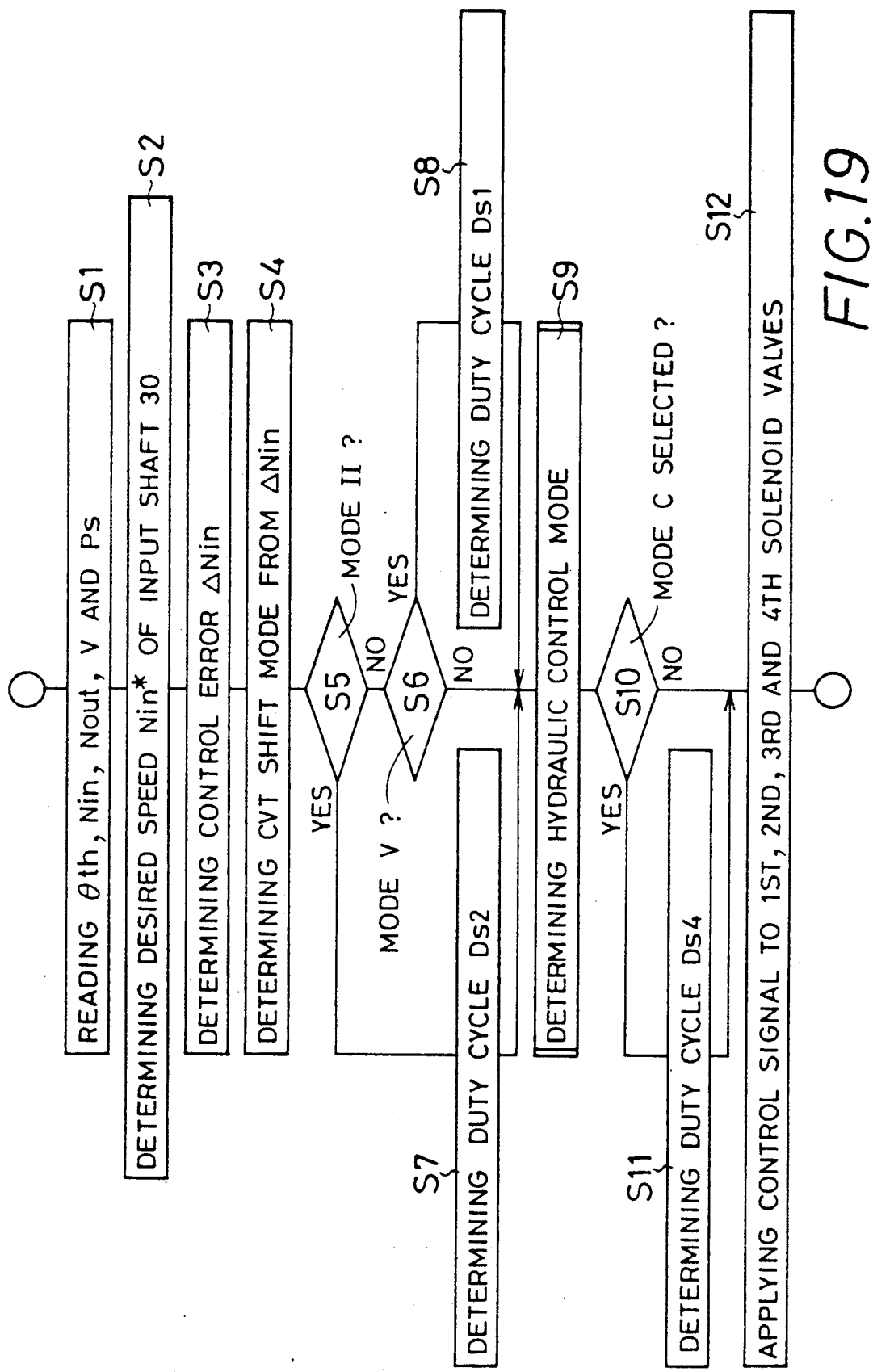
FIG. 19 is a flow chart illustrating an operation of the hydraulic control apparatus of FIG. 2.

The shifting operations of the CVT 14 are controlled, for example, according to a control program as illustrated in the flow chart of FIG. 19.

Initially, step S1 is executed to read in the various input signals from the various sensors, and to calculate the vehicle running speed V, speeds Nin and Nout of the input and output shafts 30, 38, throttle opening angle $\theta$th, and currently selected position Ps of the shift lever 252, based on the received input signals. Then, the control flow goes to step S2 in which a desired or target speed Nin* of the input shaft 30 is determined based on the shift lever position Ps, throttle opening angle $\theta$th and vehicle running speed V, more precisely, according to a predetermined relationship represented by a functional equation Nin* = f($\theta$th, V, Ps) or by the corresponding data map. This relationship, which is stored in the ROM of the control device 460, is determined for each of the DRIVE, SECOND and LOW positions "D", "S" and "L" of the shift lever 252, so that the relevant relationship provides a currently required output of the engine 10 represented by the throttle opening angle $\theta$th, with a minimum fuel consumption by the engine. When the shift lever 252 is placed in the SECOND or LOW position "S", "L", it is generally required or desirable that the vehicle runs in a sporty manner with high drivability, and with a relatively high effect of engine-braking. In view of this requirement, the relationship used for the SECOND or LOW position is determined so that the desired input shaft speed Nin* is higher than that for the DRIVE position, or so that the speed ratio "e" is comparatively low. While the present power transmitting system (shift lever 250 and shift lever valve 250) has the three forward drive positions, DRIVE (D), SECOND (S) and LOW (L), the forward drive positions may be determined otherwise. For example, three or more forward drive positions may be provided in addition to the DRIVE position.

In the following step S3, the CPU of the control device 460 determines a control error $\Delta$Nin (=Nin*−Nin) which is a difference between the speed Nin of the input shaft 30 actually detected by the sensor 464 and the determined desired speed Nin*. Step S3 is followed by step S4 to determine or select one of six shift modes I, II, III, IV, V and VI as indicated in the table of FIG. 10, based on the determined control error $\Delta$Nin, more specifically, depending upon one of six ranges of the control error amount $\Delta$Nin as indicated by hatched areas in the right-hand side portion of FIG. 10. The adjacent ranges of the error amount $\Delta$Nin overlap each other at their end portions, so as to avoid control instability when the corresponding adjacent shift modes (as indicated in FIG. 10) are repeatedly alternately selected under some conditions. If the currently detected control error $\Delta$Nin falls within the overlapping area of the two adjacent ranges, the currently selected shift mode remains to be selected. For example, if the detected control error $\Delta$Nin is reduced from 250 rpm (within the range corresponding to the shift mode II) to 140 rpm within the overlapping area between the ranges corresponding to the shift modes II and III while the shift mode II is selected, the currently selected shift mode is continuously selected. If the control error $\Delta$Nin is changed to a value falling within the overlapping area between the ranges corresponding to the shift modes II and III while the shift mode III is selected, the shift mode III is continuously used.

After the shift mode is selected or determined, step S5 is executed to determine whether the shift mode II is currently selected or not, and then step S6 is executed to determine whether the shift mode V is currently selected or not. If the shift mode II has been selected in step S4, an affirmative decision (YES) is obtained in step S5, and the control flow goes to step S7 in which the duty cycle Ds2 of the second solenoid-operated valve 268 is calculated according to the following equation (4). If the shift mode V has been selected in step S4, an affirmative decision (YES) is obtained in step S6, and the control flow goes to step S8 in which the duty cycle Ds2 of the valve 268 is determined according to the following equation (5):

$$Ds2 = 100\% - K1 \cdot \Delta Nin \quad (4)$$

$$Ds2 = -K2 \cdot \Delta Nin \quad (5)$$

where, K1, K2: Constants

These two different equations (4) and (5) are used for determining the duty cycle Ds2, since the flow characteristic of the flow control valve 264 with respect to the duty cycle Ds2 differs between the shift modes II and V. The graph of FIG. 20 indicates the flow characteristic of the valve 264 when the shift mode II (MEDIUM SHIFT DOWN mode) is selected with the first solenoid-operated valve 266 placed in the ON position, while the graph of FIG. 21 indicates the flow characteristic when the shift mode V (MEDIUM SHIFT UP mode) is selected with the valve 266 placed in the OFF position. The flow rate Q shown in these graphs of FIGS. 20 and 21 is that of the fluid flowing through a passage connecting the two output ports 286b and 286e of the flow control valve 266 when the fluid pressure is held constant.

Figure 20:
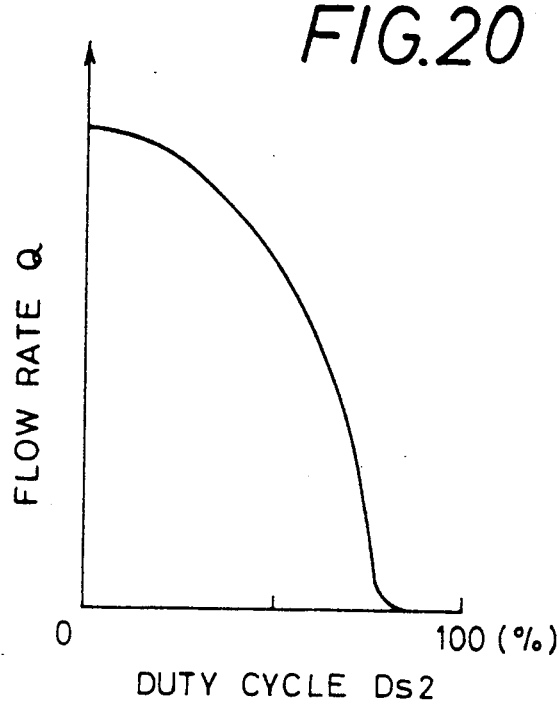
FIGS. 20 and 21 are graphs indicating relationships between the duty cycle of the second solenoid valve, and the flow rate of the flow control valve of the shift control valve assembly, which varies with the duty cycle, where the CVT speed ratio changes to reduce and increase the vehicle speed, respectively.
Figure 21:
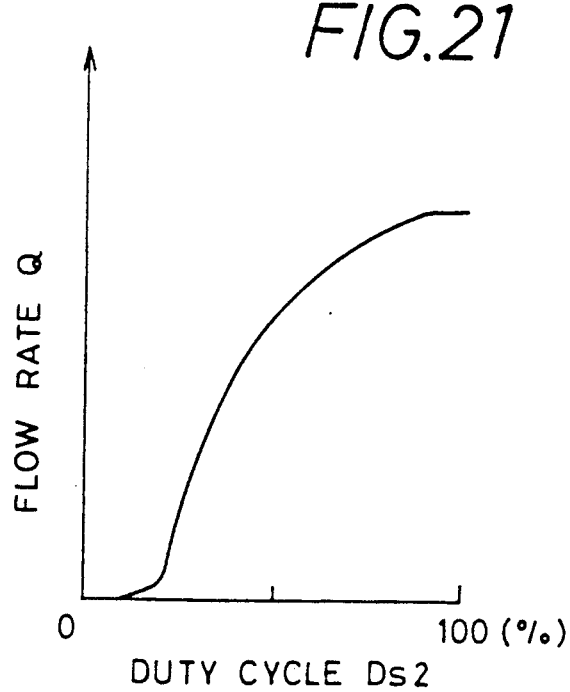

Thus, when the second solenoid-operated valve 268 is turned ON while the first solenoid-operated valve 266 is ON, the flow control valve 264 is fully closed, whereby the flow rate Q is reduced with an increase in the duty cycle Ds2, as indicated in FIG. 20. When the valve 268 is turned ON while the valve 266 is OFF, the flow control valve 264 is fully opened, whereby the flow rate Q is increased with the duty cycle Ds2, as indicated in FIG. 21.

The first and second solenoid-operated valves 266 and 268 are operated in step S12 (which will be described in detail), according to the ON-OFF states determined by the shift mode selected in step S4, and according to the duty cycle Ds2 determined in step S7 or S8 (for the second solenoid-operated valve 268 only). The duty cycling operation of the second solenoid-operated valve 268 in the shift modes II and V is effected by alternately turning on and off the solenoid coils in a predetermined cycle time Td, with an ON time Td·Ds2/100 and an OFF time Td·(1−Ds2/100). The duty cycle Ds2 of the valve 268 determined according to the equation (4) or (5) causes the flow rate Q of the flow control valve 264 to increase as a function of the amount of control error $\Delta$Nin, so that the flow rate Q is controlled so as to reduce the amount of control error $\Delta$Nin. Consequently, the actually detected speed Nin eventually coincides with the determined desired or target speed Nin* by controlling the flow control valve 264 in step 12, with the second solenoid-operated valve 268 operated with the duty cycle Ds2 determined in step S7 or S8. Thus, the feedback control of the flow control valve 264 for controlling the speed ratio "e" of the CVT 14 is effected.

Figure 22:
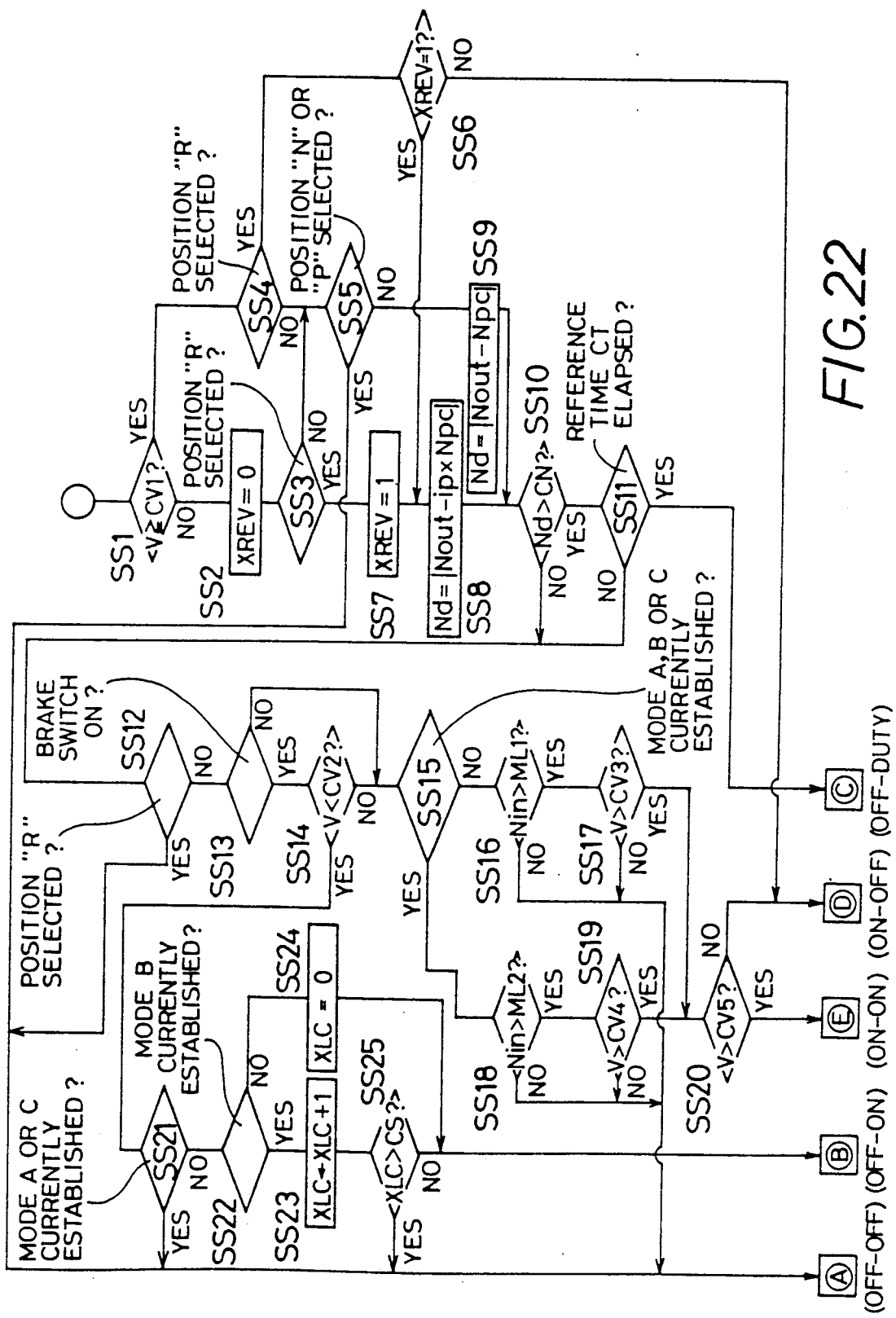
FIG. 22 is a flow chart illustrating a control routine executed in step S9 of the flow chart of FIG. 19.

Steps S7, S6 and S8 are followed by step S9 to determine or select one of five hydraulic control modes A, B, C, D and E which are established by the third and fourth solenoid-operated valves 330 and 346, as indicated in the table of FIG. 23, that is, LOCK-UP CLUTCH RELEASE mode A, LOCK-UP CLUTCH RAPID RELEASE mode B, ACCUMULATOR BACK PRESSURE CONTROL mode C, REVERSE INHIBIT mode D and 2ND LINE PRESSURE REDUCTION mode E. This mode determining routine is effected as indicated in the flow chart of FIG. 22, for example. In FIG. 22, steps SS1 through SS7 relate to the REVERSE INHIBIT mode D.

Initially, step SS1 is executed to determine whether or not the detected vehicle running speed V is equal to or higher than a predetermined reference value Cv1 stored in the ROM of the control device 460. This reference value Cv1, which is set at about 7-10 km/h, is used to determine whether the vehicle running speed V is higher than the level above which the shock produced by the operation of the reversing device 16 to its reverse position will cause a slip of the belt 44. If the vehicle speed V is lower than the reference value Cv1, step SS1 is followed by step SS2 to reset a flag XREV to zero, and step SS3 to determine whether the shift lever 252 is placed in the REVERSE position "R" or not. If the lever 252 is placed in the position "R", step SS7 is executed to set the flag XREV to "1". That is, the flag XREV is set to "1" when the vehicle is started in the REVERSE position "R", and set to "0" when the vehicle is started in the position other than the REVERSE position "R".

If the vehicle running speed V rises to the reference value Cv1, an affirmative decision (YES) is obtained in step SS1, and the control flow goes to step SS4 to determine whether the shift lever 252 is placed in the REVERSE position "R", or not. If not, it is not necessary to effect an operation in the REVERSE INHIBIT mode D. In this case, step SS5 is executed to determine whether or not the shift lever 252 is placed in the NEUTRAL or PARKING position "N", "P". If an affirmative decision (YES) is obtained in step SS5, the LOCK-UP CLUTCH RELEASE mode A is established, for releasing the lock-up clutch 36. As indicated in FIG. 23, the LOCK-UP CLUTCH RELEASE mode A is established by turning OFF both of the third and fourth solenoid-operated valves 330, 346. In this mode, the lock-up clutch 36 is released irrespective of the vehicle running speed V.

If a negative decision (NO) is obtained in step SS5, that is, if the shift lever 252 is placed in any one of the forward drive positions "D", "S" and "L", step SS9 is executed. If an affirmative decision (YES) is obtained in step SS4, i.e., if the REVERSE position "R" is selected, step SS6 is executed to determine whether the flag XREV is set at "1" or not. If the flag XREV is set at "1", this means that the position "R" remains selected, and therefore step SS8 is executed. If the flag XREV is not set at "1", i.e., is set at "0", this means that the shift lever 252 is operated from any forward drive position "D", "S" or "L" to the REVERSE position "R", and therefore the REVERSE INHIBIT mode D is established. Thus, steps SS1, SS2, SS4 and SS6 correspond to means for detecting that the shift lever 252 is operated from one of the forward drive positions "D", "S" and "L" to the REVERSE position "R".

If the shift lever 252 is operated from the DRIVE position "D" to the NEUTRAL position "N" and then to the REVERSE position "R" while the vehicle is running at a comparatively high speed not lower than the reference value Cv1, the negative decision (NO) is obtained in step SS6, and the REVERSE INHIBIT mode D is selected as described above. This mode D is established by turning OFF the third and fourth solenoid-operated valves 330 and 346. In this mode, the REVERSE INHIBIT valve 420 inhibits the supply of the fluid to the REVERSE brake 70, to thereby prevent the reversing device 16 from being brought to the reverse position, even if the shift lever 252 is operated to the REVERSE position "R".

As indicated above, the flag XREV is set to "1", if the vehicle is started with the shift lever 252 placed in the REVERSE position "R", and the vehicle speed V reaches the reference value Cv1, or if the shift lever 252 is operated to the REVERSE position "R" after the shift lever is once operated to the NEUTRAL position "N" at the vehicle speed V not lower than the reference value Cv1. Accordingly, the affirmative decision (YES) is obtained in step SS6, whereby the ACCUMULATOR BACK PRESSURE CONTROL mode C or LOCK-UP CLUTCH RELEASE mode A is eventually established. In these modes C and A, the third solenoid-operated valve 330 is turned OFF, and the reversing device 16 is permitted to be placed in the reverse position.

In the situations where the REVERSE INHIBIT mode D is not established and neither the position "N" nor position "P" is selected, step SS8 is executed if the position "R" is selected, and step SS9 is executed if the position "D", "S" or "L" is selected. In these steps SS8 and SS9, a difference Nd between the input and output shafts 38, 58 of the reversing device 16 is calculated, according to the following equations (6) and (7), respectively:

$$Nd = |Nout - Ip \cdot Npc| \qquad (6)$$

$$Nd = |Nout - Npc| \qquad (7)$$

where,
Nout: rotating speed of output shaft 38 of CVT 14
Npc: rotating speed of carrier 60 of device 16
Ip: gear ratio of the device 16 when placed in the reverse position The value Npc is obtained according to the following equation (8) based on the vehicle speed V, and the value Ip is obtained according to the following equation (9), based on the values Nout and Npc when the REVERSE brake 70 is fully engaged:

$$Npc = C/V \qquad (8)$$

$$Ip = Nout/Npc \qquad (9)$$

where, C: constant

Steps SS8 and SS9 are followed by step SS10 to determine whether the speed difference Nd calculated as described above is larger than a reference value $C_N$ stored in the ROM, or not. This reference value $C_N$, which is about 30 rpm, for example, is used to determine whether the FORWARD clutch 72 or REVERSE brake 70 has been fully engaged or not. If a negative decision (NO) is obtained in step SS10, this means that the clutch 72 or brake 70 has been fully engaged, and therefore step SS12 and subsequent steps are executed. If an affirmative decision (YES) is obtained in step SS10, this means that the clutch 72 or brake 70 has not been fully engaged, and step SS11 is executed to determine whether a time after the start of a shifting operation from the position "N" or "P" to the position "D", "S" or "L" exceeds a predetermined reference time $C_T$ stored in the ROM, or not. This reference time $C_T$ is used to determine whether the time of engagement of the FORWARD clutch 72 or REVERSE brake 70 exceeds a nominal or normal engagement time. The time $C_T$ is slightly longer than the time normally required for the clutch 72 or brake 70 to be fully engaged. If the reference time $C_T$ has not elapsed after the start of shifting, step SS11 is followed by step SS12. If the reference time $C_T$ has elapsed, the ACCUMULATOR BACK PRESSURE CONTROL mode C is established.

If the negative decision (NO) is obtained in step SS10 or SS11 and the ACCUMULATOR BACK PRESSURE CONTROL mode C is not established, step SS12 is executed to determine whether the REVERSE position "R" is selected or not. If the position "R" is selected, the LOCK-UP CLUTCH RELEASE mode A is selected without execution of any subsequent steps. In this mode A, the third solenoid-operated valve 330 is placed in the OFF state with the shift lever 252 placed in the position "R", so as to prevent the reversing device 16 from being placed in the reverse position, namely, so as to permit the REVERSE brake 70 to be engaged to run the vehicle in the reverse direction.

If a negative decision (NO) is obtained in step SS12, step SS13 is implemented to determine whether the BRAKE switch 472 is in the ON state, or not. Then, step SS14 is implemented to determine whether the vehicle running speed is lower than a reference value Cv2 stored in the ROM. This reference value Cv2, which is about 40 Km/h, for example, is used to determine whether or not the condition for releasing the lock-up clutch 36 during brake application has been satisfied.

If the BRAKE switch 472 is ON and the vehicle speed V is lower than the reference value Cv2, namely, if the condition for releasing the lock-up clutch 36 has been satisfied, the control flow goes to step SS21 for selecting the LOCK-UP CLUTCH RELEASE mode A or LOCK-UP CLUTCH RAPID RELEASE mode B. More specifically, step SS21 is implemented to determine whether or not the currently selected hydraulic control mode is one of the LOCK-UP CLUTCH RELEASE and ACCUMULATOR BACK PRESSURE CONTROL modes A and C, which do not require a rapid releasing of the lock-up clutch 36. If an affirmative decision (YES) is obtained in step SS21, the LOCK-UP CLUTCH RELEASE mode A is selected. If a negative decision (NO) is obtained in step SS21, the control flow goes to step SS21 to determine whether the currently selected mode is the LOCK-UP CLUTCH RAPID RELEASE mode B or not. If the currently selected mode is not the mode B, step SS24 is executed to reset a time counter XLC to zero, and then the RAPID RELEASE mode B is selected. If the mode B is currently selected, step SS22 is followed by SS23 in which the time counter XLC is incremented. Step SS23 is followed by step SS24 to determine whether or not the current content of the time counter XLC exceeds a predetermined reference value Cs stored in the ROM. If the current count of the counter XLC is smaller than the reference value Cs, the LOCK-UP CLUTCH RAPID RELEASE mode B is maintained. If the count exceeds the reference value Cs, the LOCK-UP CLUTCH RELEASE mode A is selected. Thus, since the LOCK-UP CLUTCH RAPID RELEASE mode B is established for a relatively short time corresponding to the reference value Cs, it is possible to prevent the lock-up clutch rapid release valve 400 from rapidly draining the engaging chamber 33 of the fluid coupling 12 through the engaging line 322, which would cause the pressure in the fluid coupling 12 to be lowered, thereby causing bubbling within the coupling 12. The reference value Cs is determined to be shorter than a time within which the bubbling may occur in the fluid coupling 12.

If the BRAKE switch 472 is not ON or the switch 472 is ON but the vehicle speed V exceeds the reference value Cv2, step SS15 is implemented to determine whether the currently selected mode is one of the modes A, B and C which require the lock-up clutch 36 to be released. Steps SS15 and SS16–SS19 are implemented to determine the engagement or releasing of the lock-up clutch 36. If an affirmative decision (YES) is obtained in step SS15, step SS18 is executed to determine whether the speed Nin of the input shaft 30 is higher than a reference value ML2, or not. If the speed Nin is higher than the reference value ML2, step SS19 is implemented to determine whether the vehicle speed V is higher than a reference value Cv4 stored in the ROM. If the vehicle speed V is higher than the reference value Cv4, step SS20 is executed to determine whether the vehicle speed V is higher than a reference value Cv5. If the speed V is higher than the reference value Cv5, the 2ND LINE PRESSURE REDUCTION mode E is selected. If the speed V is equal to or lower than the reference value Cv5, the REVERSE INHIBIT mode D is selected. In these modes E and D wherein the third solenoid-operated valve 330 is placed in the ON state, the lock-up clutch 36 is engaged. If a negative decision (NO) is obtained in both steps SS18 and SS19, the normal LOCK-UP CLUTCH RELEASE mode A is selected. Namely, the lock-up clutch 36 is kept in the released state.

If the checking in step SS15 reveals that none of the modes A, B and C is selected, the control flow goes to step SS16 to determine whether the speed Nin is higher than a predetermined reference value ML1, or not. If an affirmative decision (YES) is obtained in step SS16, the control flow goes to step SS17 to determine whether the vehicle running speed V is higher than a predetermined reference value Cv3 stored in the ROM. If a negative decision (NO) is obtained in step SS16 or SS17, the LOCK-UP CLUTCH RELEASE mode A is selected. If an affirmative decision (YES) is obtained in both steps SS16 and SS17, step SS20 is executed to determine whether the vehicle speed V is higher than a reference value Cv5. If the vehicle speed V is higher than the reference value Cv5, the 2ND LINE PRESSURE REDUCTION mode E is selected. In this mode, the third and fourth solenoid-operated valves 330 and 346 are both placed in the ON state, so that the second line pressure Pl2 is lowered. If the vehicle speed V is equal to or lower than the reference value Cv5, the REVERSE INHIBIT mode D is selected, and the second line pressure Pl2 is normally regulated.

It will be understood from the foregoing explanation on steps SS15 through SS19 that the lock-up clutch 36 is engaged if the inequalities Nin > ML2 and V > Cv4 are satisfied when the lock-up clutch 36 is in the released state, and that the lock-up clutch 36 is released if the inequalities Nin < ML1 and V < Cv3 are satisfied when the lock-up clutch 36 is in the engaged state. The reference values ML1 and ML2 are determined based on the detected throttle opening angle $\theta$th, according to a function stored in the ROM of the control device 460, so that the reference values ML1 and ML2 increase with an increase in the throttle opening angle $\theta$th. For the same throttle opening angle $\theta$th, the reference value ML1 is set larger than the reference value ML2, for avoiding the control instability. The reference values Cv3 and Cv4 are set at values about 20 km/h, and the reference value Cv3 is set larger than the reference value Cv4 for the same reason as indicated above.

Referring back to the flow chart of FIG. 19, the control flow goes to step S10 after one of the hydraulic control modes A–E is selected. In step S10, the CPU of the control device 460 determines whether the ACCUMULATOR BACK PRESSURE CONTROL mode C is selected, or not. If the mode C is selected, step S10 is followed by step S11 in which the duty cycle Ds4 of the fourth solenoid-operated valve 346 is determined. Step S11 is followed by step S12. If the mode C is not selected, the control flow goes directly to step S12.

The duty cycle Ds4 is determined so that the accumulators 342 and 340 are given suitable levels of back pressures for assuring smooth engagement of the FORWARD clutch 72 and REVERSE brake 70 when the shift lever 252 is shifted to any one of the forward drive positions "D", "S" and "L" or to the REVERSE position "R". The duty cycle Ds4 is determined from time to time, according to one of two predetermined functions (stored in the ROM) which include control parameters such as the speed Nin of the input shaft 30 upon shifting of the shift lever 252, and a time elapse "t" after the start of the shifting operation. The two functions correspond to the forward and reverse shiftings. The graph of FIG. 24 indicates a change in the duty cycle Ds4 with time in relation to the speed Nout of the output shaft 38, when the shift lever 252 is shifted from the NEUTRAL position "N" to the DRIVE position "D" while the vehicle is stopped.

In step S12, the control device 460 applies control signals to the first, second, third and fourth solenoid-operated valves 266, 268, 330 and 346, so that the solenoid coils of these valves are placed in the appropriate ON or OFF state or energized in the controlled duty cycle (for the valves 268 and 346), depending upon the CVT shift mode selected in step S4 and the hydraulic control mode selected in step S9.

In the hydraulic control circuit as described above, the lock-up clutch 36 is rapidly released by turning OFF the third solenoid-operated valve 330 and turning ON the fourth solenoid-operated valve 346. In this case, the fluid whose pressure regulated by the lock-up pressure regulating valve 310 is supplied to the releasing chamber 35 of the lock-up clutch 36 through the lock-up clutch control valve 320 and through the releasing line 324. At the same time, the engaging chamber 33 of the fluid coupling 12 is drained through the engaging line 322 while the line 322 is opened to the atmosphere through the drain port 402c of the lock-up clutch rapid release valve 400. Thus, the lock-up clutch 36 is released. Further, the lock-up clutch rapid release valve 400 operates to apply the rapid release pressure to the chamber 316 of the lock-up pressure regulating valve 310, so that the LOCK-UP CLUTCH pressure Pcl regulated by the valve 310 and applied to the releasing chamber 35 of the lock-up clutch 36 through the valve 320 is raised, to enable the lock-up clutch 36 to be rapidly released. This arrangement prevents stalling of the engine 10 upon abrupt brake application or brake application on a road surface having a low friction coefficient, even if the lock-up clutch 36 is commanded to be released when the vehicle speed is lowered to a relatively low level. In other words, the lock-up clutch rapid release valve 400 improves the releasing response of the lock-up clutch 36.

A modified embodiment of the present invention will be described by reference to FIGS. 25 and 26. In the interest of brevity and simplification, the same reference numerals as used in the first embodiment described above will be used in connection with this modified embodiment, to identify the functionally corresponding components. Redundant description of these components will not be provided.

Figure 25:
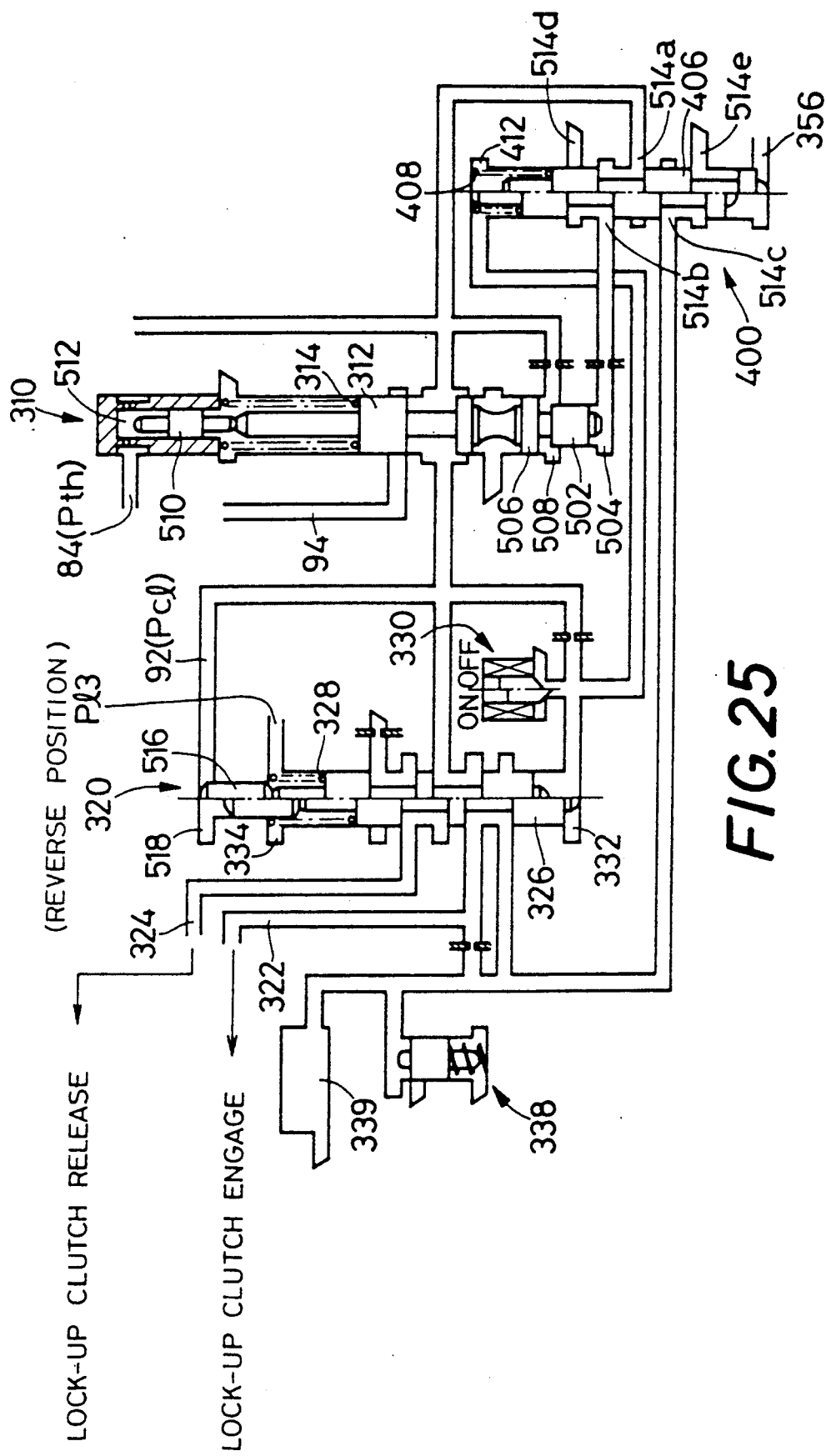
FIG. 25 is a fragmentary view showing another embodiment of the hydraulic control apparatus of the present invention, which uses a modified lock-up clutch control valve.

Referring to FIG. 25, there is shown a modified lock-up pressure regulating valve 310, which has a chamber 504 adjacent to a first land 502 of the spool 312. This chamber 504 is adapted to receive the LOCK-UP CLUTCH pressure Pcl through the lock-up clutch rapid release valve 400. The lock-up pressure regulating valve 310 further has a chamber 508 defined between the first land 502 and a second land 506 remote from the chamber 504. The chamber 508 is adapted to receive as the feedback pressure the LOCK-UP CLUTCH pressure Pcl. The valve 310 includes an axially slidable plunger 510 which is held in abutting contact with the end of the spool 312 on the side of the spring 314. Adjacent to this plunger 510, which has a smaller diameter than the lands 502, 506, there is formed a chamber 512 which communicates with the line 84, so that the THROTTLE pressure Pth always acts on the end face of the plunger 510 remote from the spool 312.

Figure 26:
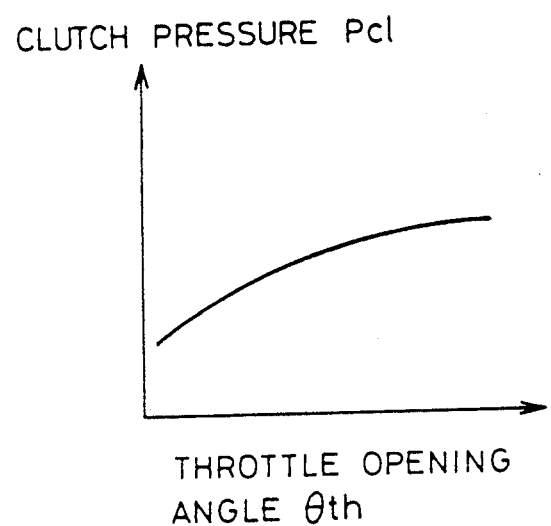
FIG. 26 is a graph indicating a relationship between the lock-up clutch pressure regulated by the valve of FIG. 25 and the throttle opening angle.

In the above arrangement of FIG. 25, the LOCK-UP CLUTCH pressure Pcl regulated by the lock-up pressure regulating valve 310 increases with the throttle opening angle $\theta$th which corresponds to the output torque of the engine 10 or other parameter representative of the currently required output of the engine 10, as indicated in FIG. 26. Thus, the engaging torque of the lock-up clutch 36 is adjusted to a required minimum level. Further, since the LOCK-UP CLUTCH pressure Pcl decreases with the throttle opening angle $\theta$th, the amount of strain of the lock-up clutch 36 which is caused by the LOCK-UP CLUTCH pressure Pcl is reduced as the throttle opening angle $\theta$th is reduced. In other words, the amount of strain of the lock-up clutch 36 is relatively small when brake is applied to the vehicle, whereby the lock-up clutch 36 can be smoothly and rapidly released upon brake application to the vehicle.

In the present modified embodiment, the lock-up clutch rapid release valve 400 has a port 514a adapted to receive the LOCK-UP CLUTCH pressure Pcl, a port 514b communicating with the chamber 504 of the valve 310, a port 514c communicating with the lock-up clutch control valve 320 and cooler 339, and a pair of drain ports 514d and 514e. Normally, the ports 514a and 514b are connected to each other to apply the LOCK-UP CLUTCH pressure Pcl to the chamber 504 of the lock-up pressure regulating valve 310. Upon rapid releasing of the lock-up clutch 36, however, the spool 406 of the rapid release valve 400 is moved toward the spring 412, whereby the port 514b and drain port 514d are connected to each other while the port 514c and drain port 514e are connected to each other. As a result, the LOCK-UP CLUTCH pressure Pcl regulated by the valve 310 is raised by a suitable amount, and the fluid discharged from the engaging chamber 33 of the fluid coupling 12 through the engaging line 322 and lock-up clutch control valve 320 is drained through the drain port 514e, so that the lock-up clutch 32 is released in a reduced time.

In the present embodiment, the lock-up clutch control valve 320 has a plunger 516 which is abutable on the spool 326, and the chamber 334 defined between the spool 326 and the plunger 516 is adapted to receive the third line pressure Pl3 only when the shift lever 252 is placed in the REVERSE position "R", as in the preceding embodiment. A chamber 518 is formed adjacent to the end face of the plunger 561 remote from the chamber 334, so that the LOCK-UP CLUTCH pressure Pcl is applied to the chamber 518.

While the two presently preferred embodiments of the invention have been described, various changes, modifications and improvements may be made in the invention.

For example, the combination of the CVT 14 and the reversing device 16 used in the illustrated embodiments may be replaced by a well-known automatic multiple-position transmission such as a planetary gear type transmission.

While the shift control valve assembly 260 used in the illustrated embodiments consists of the directional control valve 262 and the flow control valve 264, the assembly 260 may be replaced by a four-way flow control valve using a linear solenoid capable of continuously changing the flow rate.

In the illustrated embodiments, the THROTTLE pressure Pth produced by the throttle sensing valve 180 which detects the throttle opening angle θth is used as a pressure representative of the currently required output of the engine 10. Where the hydraulic control apparatus of the invention is used for a vehicle having a diesel engine without a throttle valve, the pressure Pth may be replaced by a pressure which represents an amount corresponding to an amount of operation of an accelerator pedal of the vehicle. In this case, the cam 184 is mechanically linked with the accelerator pedal, so that the cam 184 is rotated as the pedal is depressed.

While the illustrated embodiments are adapted such that the speed ratio "e" of the CVT 14 is controlled so that the actually detected speed Nin of the input shaft 30 coincides with a determined desired or target speed Nin*, it is possible to control the speed ratio "e" so that the actually detected speed ratio "e" coincides with a determined desired ratio "e*", since the speed ratio "e" is equal to Nout/Nin.

The reversing device 16 which is located between the output shaft 38 of the CVT 14 and the intermediate gear device 18 in the illustrated embodiments, may be disposed between the fluid coupling 12 and the input shaft 30 of the CVT 14. The reversing device 16 may have two or more forward drive positions in addition to the reverse position.

The fluid coupling 12 may be replaced by other couplings or torque converters.

What is claimed is:

1. A hydraulic control apparatus for a power transmitting system for an automotive vehicle having a fluid coupling equipped with a lock-up clutch, and a transmission to which power is transmitted from an engine of the vehicle through the fluid coupling, the fluid coupling having an engaging chamber and a releasing chamber for operating the lock-up clutch such that the lock-up clutch is engaged and released with a working fluid supplied to one of the engaging and releasing chambers and discharged from the other of the chambers, wherein the improvement comprises:

a discharge passage communicating with said engaging chamber of said fluid coupling, for normally draining said engaging chamber to a drain;

a lock-up clutch rapid release valve connected to said discharge passage, and operable to bypass connect said discharge passage to said drain therethrough, for thereby rapidly draining said engaging chamber to rapidly release said lock-up clutch; and a lock-up pressure regulating valve for regulating a lock-up clutch pressure applied to said fluid coupling, normally to a first value, and upon operation of said lock-up clutch rapid release valve, to a second value higher than said first value.

2. A hydraulic control apparatus according to claim 1, further comprising a lock-up clutch control valve for applying said lock-up clutch pressure selectively to one of said engaging and releasing chambers of said fluid coupling while permitting the other chamber to be normally drained, said engaging chamber being drained through said discharge passage and said lock-up clutch control valve when said lock-up clutch rapid release valve is not operated, and being rapidly drained through a part of said discharge passage and said lock-up clutch rapid release valve when the lock-up clutch rapid release valve is operated.

3. A hydraulic control apparatus according to claim 1, wherein said lock-up pressure regulating valve has a spool for regulating said lock-up clutch pressure, and a chamber for receiving a pilot pressure to bias said spool in a direction for increasing said lock-up clutch pressure, and said lock-up clutch rapid release valve has a port for applying said pilot pressure to said chamber of said lock-up clutch pressure regulating valve, upon operation of said lock-up clutch rapid release valve, to regulate said lock-up clutch pressure to said second value.

4. A hydraulic control apparatus according to claim 1, wherein the lock-up pressure regulating valve has a spool for regulating said lock-up clutch pressure, and a chamber for receiving a pilot pressure to bias said spool in a direction for reducing said lock-up clutch pressure, and said lock-up clutch rapid release valve has a port for normally applying said pilot pressure to said chamber of said lock-up clutch pressure regulating valve, said port being connected to a drain to drain said chamber of the lock-up pressure regulating valve, upon operation of said lock-up clutch rapid release valve, to regulate said lock-up clutch pressure to said second value.

5. A hydraulic control apparatus according to claim 3, wherein said lock-up pressure regulating valve has another chamber for biasing said spool in a direction for increasing said lock-up clutch pressure, said another chamber receiving another pilot pressure which is indicative of a currently required output of said engine.

6. A hydraulic control apparatus according to claim 1, further comprising solenoid-operated valve means for operating said lock-up clutch rapid release valve, and control means for controlling said solenoid-operated valve means to be operated to a position in which said discharge passage is connected to said drain by said lock-up clutch rapid release valve and a pilot pressure is applied from said lock-up clutch rapid release valve to said lock-up clutch pressure regulating valve for increasing said lock-up pressure to said second value.

7. A hydraulic control apparatus according to claim 6, wherein said control means controls said solenoid-operated valve means, depending upon a running speed of the vehicle.

8. A hydraulic control apparatus according to claim 7, wherein said control means controls said solenoid-operated valve means so as to connect said discharge passage to said drain through said lock-up clutch rapid release valve and apply said pilot pressure to said lock-up clutch pressure regulating valve, when said running speed of the vehicle falls below a predetermined lower limit.

9. A hydraulic control apparatus according to claim 6, wherein said control means controls said solenoid-operated valve means, depending upon whether a brake is being applied to said vehicle or not.

10. A hydraulic control apparatus according to claim 1, wherein said engaging chamber of said fluid coupling is normally drained through an oil cooler for cooling a working fluid used for operating said fluid coupling and said transmission.

11. A hydraulic control apparatus according to claim 1, wherein said transmission includes a continuously variable transmission having a pair of shafts one of which is connected to said fluid coupling, a pair of variable-diameter pulleys provided on said pair of shafts, respectively, and a belt connecting said pulleys.

* * * * *